United States Patent
Glugla et al.

(10) Patent No.: US 10,935,462 B2
(45) Date of Patent: Mar. 2, 2021

(54) METHOD FOR VARIABLE COMPRESSION RATIO ENGINE

(71) Applicant: Ford Global Technologies, LLC, Dearborn, MI (US)

(72) Inventors: Christopher Paul Glugla, Macomb, MI (US); Gopichandra Surnilla, West Bloomfield, MI (US); Imtiaz Ali, Lathrup Village, MI (US); Lyth Alobiedat, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 15/963,974

(22) Filed: Apr. 26, 2018

(65) Prior Publication Data

US 2019/0331553 A1    Oct. 31, 2019

(51) Int. Cl.
| | |
|---|---|
| *G01M 15/06* | (2006.01) |
| *F02D 15/02* | (2006.01) |
| *F02D 41/00* | (2006.01) |
| *F02B 75/04* | (2006.01) |

(52) U.S. Cl.
CPC .......... *G01M 15/06* (2013.01); *F02B 75/048* (2013.01); *F02D 15/02* (2013.01); *F02D 41/009* (2013.01)

(58) Field of Classification Search
CPC ....... G01M 15/06; G01M 15/08; F02D 15/00; F02D 15/02; F02D 35/023; F02D 35/028; F02D 41/009; F02D 2041/2058; F02B 75/048; F02B 75/04; F01B 31/14
See application file for complete search history.

(56) References Cited

U.S. PATENT DOCUMENTS

| | | | |
|---|---|---|---|
| 6,553,816 B1 * | 4/2003 | Palanisamy | F02D 41/22 324/378 |
| 7,802,544 B2 | 9/2010 | Kamada | |
| 9,528,437 B2 | 12/2016 | Tanaka | |
| 9,644,546 B2 | 5/2017 | Sakayanagi et al. | |
| 10,012,152 B2 * | 7/2018 | Shinozaki | F02P 5/145 |
| 10,253,700 B2 * | 4/2019 | Takahashi | F02B 75/32 |
| 2015/0136089 A1 | 5/2015 | Tanaka | |
| 2018/0023486 A1 * | 1/2018 | Yamashita | F02B 75/041 123/480 |

* cited by examiner

*Primary Examiner* — Grant Moubry
(74) *Attorney, Agent, or Firm* — Geoffrey Brumbaugh; McCoy Russell LLP

(57) ABSTRACT

Methods and systems are provided for estimating an actual compression ratio of an engine cylinder based on the electric current applied to an actuator of the associated variable compression ratio mechanism. The compression ratio is estimated as a function of both a value and a location, relative to cylinder piston position, of a peak holding current applied by an electric motor on the actuator to maintain the actuator at a commanded compression ratio setting. In this way, the vehicle control system may more accurately infer the current actual compression ratio of each cylinder.

9 Claims, 7 Drawing Sheets

METHOD FOR VARIABLE COMPRESSION RATIO ENGINE

FIELD

The present description relates generally to methods and systems for a variable compression ratio engine.

BACKGROUND/SUMMARY

The compression ratio (CR) of an internal combustion engine is defined as the ratio of the cylinder volume when the piston is at bottom-dead-center (BDC) to the cylinder volume when the piston is at top-dead-center (TDC). Generally, the higher the compression ratio, the higher the thermal efficiency and fuel economy of the internal combustion engine. Variable Compression Ratio (VCR) engines may mechanically vary the compression ratio of each cylinder (e.g., via an eccentric coupled to the piston of each cylinder) between a high compression ratio (HCR) and a low compression ratio (LCR) setting. Specifically, via mechanical shifting of the piston position in the bore so that it is closer or farther from the top of the bore, the volume at TDC, and thereby the compression ratio setting, can be varied. The HCR setting may be used at light to moderate loads (that is, during knock-free conditions) to take advantage of the higher thermal efficiency and the resulting improved fuel economy. The HCR setting may be maintained until spark retard from early knock onset erodes the fuel economy benefit. Thereafter, the engine may be transitioned to the LCR setting, trading off thermal efficiency for combustion phasing efficiency. Continuously variable systems may adjust the compression ratio setting to optimize the combustion phasing and thermal efficiency for the given operating conditions between the limits of the lowest and highest compression ratio setting.

To improve engine control, as well as for diagnostic requirements, an engine controller may need to determine the actual compression ratio of the engine, which may differ from the commanded compression ratio. This is because the CR calibration, for example the CR commanded as a function of engine speed and load, may be calibrated based on a prototype engine. Due to part-to-part variation and assembly tolerances, the actual CR may be significantly different than the CR estimated based on a prototype engine. Accordingly, various approaches have been developed for estimating an actual compression ratio of an engine.

One example approach is shown by Tanaka in U.S. Pat. No. 9,528,437. Therein, a controller measures an exhaust temperature and/or an exhaust pressure which varies according to an actual expansion ratio, and estimates the current mechanical compression ratio of the engine based on the measured values. In one example, the actual compression ratio is estimated based on a measured boost pressure. Further, differences between the actual compression ratio and the commanded compression ratio may be compensated for via valve timing adjustments. One potential issue with such an approach is that it may be prone to errors due to variability in combustion events. In addition, the approach requires sustained boosted engine operation. Further still, there may be situations where valve timing adjustments may not be able to compensate for the CR difference.

Another example approach is shown by Kamada et al. in U.S. Pat. No. 7,802,544. Therein, a drive output of a VCR actuator that changes the position of a piston top dead center (TDC) is correlated with the actual CR of the engine, and the engine load. However, one potential issue with such an approach is that based on the intake and exhaust cam timing (or valve timing), the estimated CR may be different from the actual (or effective) CR. There may be further variations due to angular drift experienced by the VCR control shaft. These are caused by the fluctuation of in-cylinder pressures. During high peak pressures, the piston forces may back drive the VCR mechanism. This is especially true if the update frequency of the VCR control unit is lower than the frequency of the high pressure peaks. As such, the pressure obtained at TDC is a function of the trapped air mass and will be governed by ideal gas law. The trapped air mass is governed by the valve timing events. Less trapped air results in a lower peak pressure, while more trapped air results in a higher peak pressure.

In one example, the issues described above may be addressed by a method for an engine comprising: commanding a compression ratio for a cylinder via a mechanically actuated variable compression ratio mechanism; and adjusting an actuator in response to an actual compression ratio of the cylinder estimated based on each of a value and a location, relative to piston position, of a peak electric current of a motor coupled to the variable compression ratio mechanism. In this way, an actual compression ratio of a cylinder may be more reliably determined.

As one example, a VCR mechanism may include an eccentric for varying a piston position of a cylinder in accordance with a commanded compression ratio. An actual compression of each cylinder may then be determined via a harmonic drive motor connected to an "s" link and eccentric of the VCR mechanism. The inventors have recognized that the link and motor are subjected to combustion loading. As each cylinder combusts, combustion forces are transmitted via the linkages to the harmonic drive motor which has to counteract these forces to maintain the compression ratio. The harmonic drive motor may have position feedback, and the engine controller applies a holding current to keep the position at the desired position based on the feedback. Since the holding current is directly proportional to the combustion forces (and leverages due to linkages), the current trace will have a similar shape to the combustion loading. Since the combustion loading (or cylinder pressure) is a function of the compression ratio, the compression ratio can be inferred from the peak holding current applied to the motor to hold a given position while accounting for any torsional drift variation. Since valve timing affects the amount of air charge retained in a cylinder, and thereby the cylinder pressure, an effective cylinder peak pressure can be accurately determined by further compensating for cylinder valve timing. In addition, a position of the peak current (in terms of crank angle degrees) allows a change in the position of a piston's top dead center to be correlated with a change in the compression ratio. By performing the measurement during a late cylinder combustion (such as when spark timing is retarded significantly from MBT), or when the engine is spinning unfueled (such as during a deceleration fuel shut-off (DFSO) even), signal to noise ratio can be improved, allowing the actual CR to be reliably determined. During the DFSO event, while there is no cylinder combustion, the VCR mechanism may be actively commanded to discrete positions, and the motor current applied to hold the mechanism at a given position may be measured to determine the actual compression ratio. Based on a difference between the commanded compression ratio and the actual compression ratio at each compression ratio setting, engine operation can be adjusted. For example, when operating at high engine loads, if the difference between the desired and actual compression ratio setting is higher than a threshold, a lower compression ratio setting may be commanded to improve knock control. As another example, where the CR of all cylinders is controlled via a single VCR actuator, the commanded CR may be selected based on engine efficiency. For example, if only one cylinder is operating at a higher than desired CR, it may be more fuel efficient to continue operating that cylinder at the higher CR while retarding spark for that cylinder by a larger amount instead of lowering the CR of all the cylinders (thereby running them at a lower thermal efficiency) so that the cylinder with the higher than desired CR is less BDL limited. However, a new CR may be commanded to all cylinders if it would result in a net improvement in engine operating efficiency.

In this way, the efficiency of a VCR engine may be improved by detecting and compensating for cylinder-to-cylinder variations in compression ratio. The technical effect of correlating the electric current of a harmonic drive motor coupled to the VCR mechanism with combustion torque and compression ratio is that CR variations can be learned in real-time, without the need for additional sensors. By performing the routine during a DFSO, the absence of fuel combustion in engine cylinders enables a more consistent relationship between VCR motor current and CR to be leveraged for CR estimation. In addition, combustion variability is removed from the input, relying instead on more repeatable engine motoring pumping work to infer the compression ratio. Further, the CR variations of each specific engine can be learned without relying on a prototype engine which may be significantly different from the given engine. Overall, engine performance and fuel efficiency of a VCR engine can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 7:
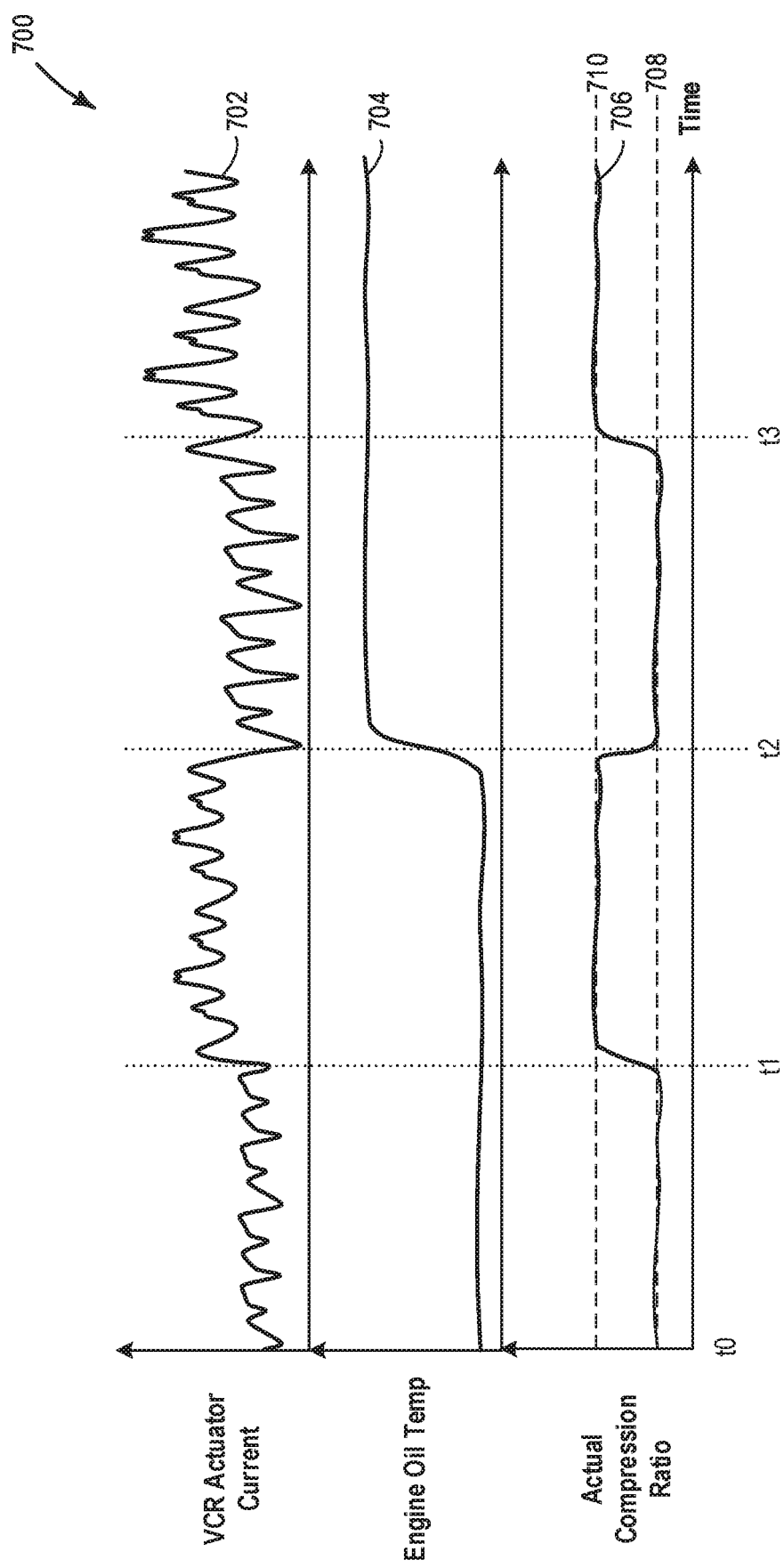
FIG. 7 shows an example timeline for VCR estimation.
Figure 8:
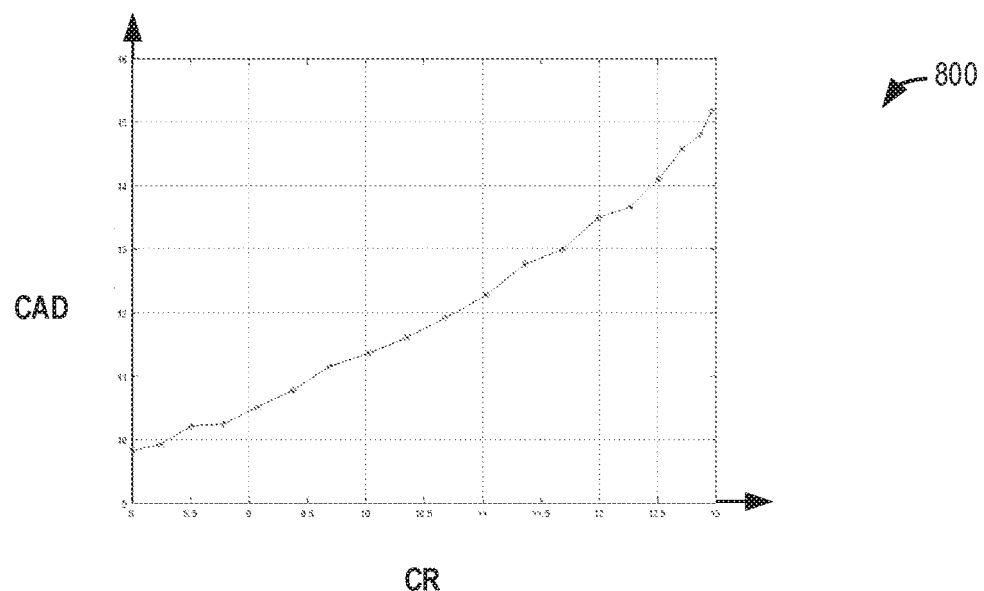
FIG. 8 shows an example relationship between location of peak cylinder pressure and compression ratio.
Figure 9:
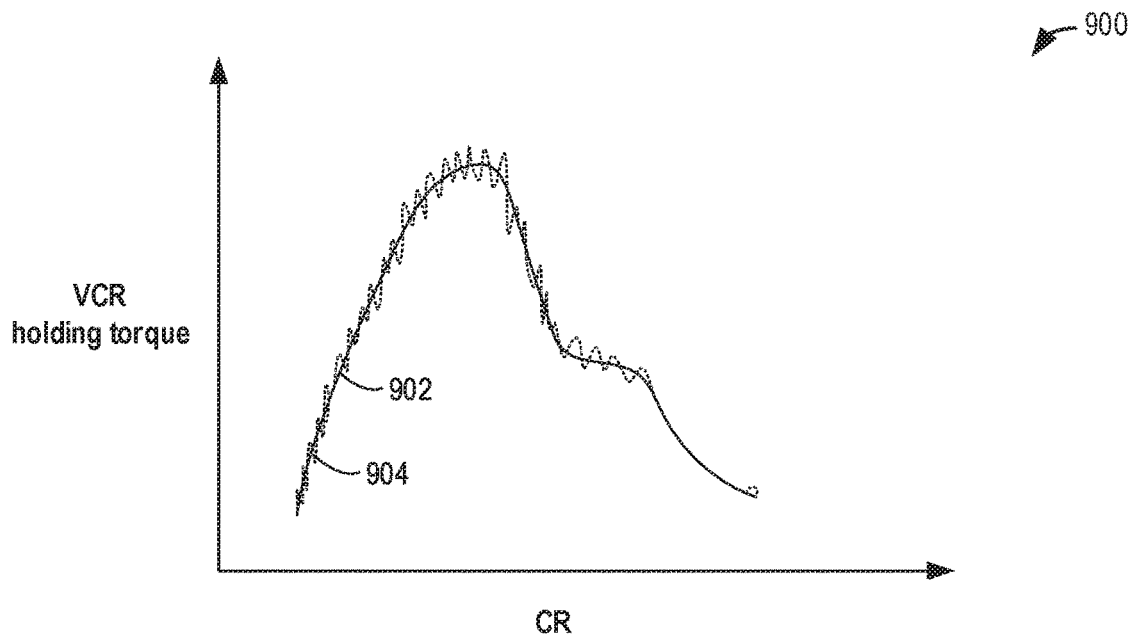
FIG. 9 shows an example of torsional drift experienced by a VCR control shaft.

The following description relates to systems and methods for an engine system configured with a variable compression ratio (VCR) mechanism, as described with reference to the engine system of FIG. 1. A controller may be configured to perform a control routine, such as the example routine of FIGS. 2 and 4, to calibrate the CR commanded during engine operation at a given engine speed-load by learning actual cylinder-to-cylinder variations in CR based on a holding current applied to a harmonic drive motor coupled to the VCR mechanism. The controller may also learn the actual CR of each cylinder during a DFSO or a late combustion event by actuating the VCR mechanism to a defined position and measuring a peak holding current of the harmonic drive motor, as well an engine position at which the holding current occurs (FIG. 5). The controller may map the actual compression ratio based on the combustion forces transmitted via linkages from the VCR mechanism to the harmonic drive motor, as shown with reference to FIG. 6. The mapping may account for torsional drift experienced by the VCR control shaft (FIG. 9), as well as a relationship between changes in a piston's top dead center at different compression ratios (FIG. 8). By learning the differences between the commanded CR and the actual CR at each CR setting (FIG. 3), a CR calibration table can be updated for improved engine control and VCR diagnostics. An example VCR estimation is shown at FIG. 7. In this way, the performance and fuel economy of a VCR engine can be improved.

Figure 1:
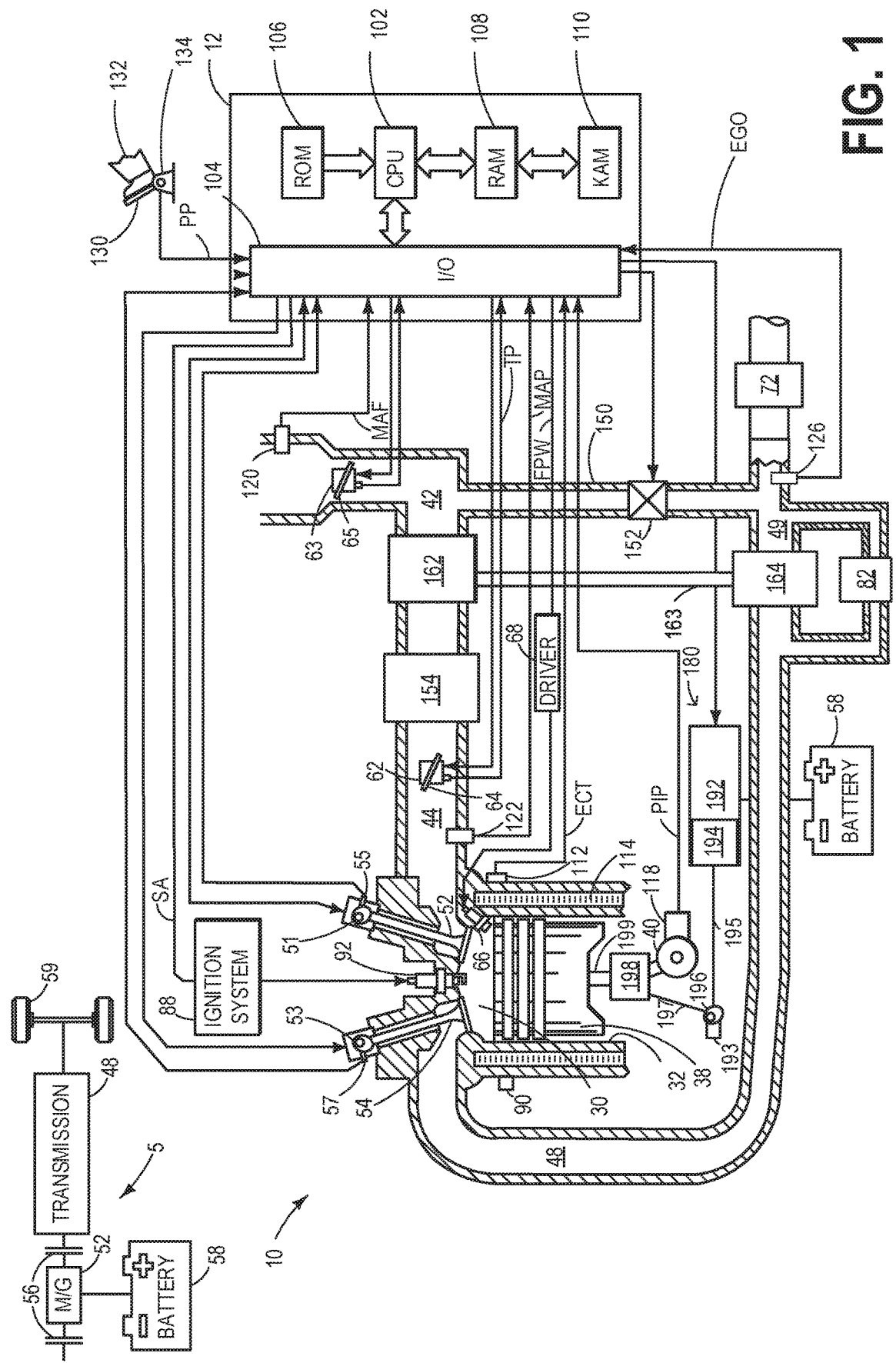
FIG. 1 shows an example variable compression ratio (VCR) engine system.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 32 with piston 38 positioned therein. Piston 38 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Engine 10 may be configured as a variable compression ratio (VCR) engine wherein the compression ratio (CR) of each cylinder (that is, the ratio of the cylinder volume when the piston is at bottom-dead-center (BDC) to the cylinder volume when the piston is at top-dead-center (TDC)) can be mechanically altered. The CR of the engine may be varied via a VCR actuator 192 actuating a VCR mechanism 180. In some example embodiments, the CR may be varied between a first, lower CR (wherein the ratio of cylinder volume when the piston is at BDC to the cylinder volume when the piston is at TDC is smaller) and a second, higher CR (wherein the ratio is higher). In still other example embodiments, there may be a predefined number of stepped compression ratios. Further still, the CR may be continuously variable between the first, lower CR and the second, higher CR (to any CR in between).

VCR mechanism 180 includes a VCR actuator 192 including a speed reduction mechanism 194, a VCR actuator linkage 195, a control shaft 196, a position sensor 193, a control link 197, a lower link 198, and an upper link 199. In some examples, the VCR actuator may additionally have one or more mid-links intermediate the upper link and the lower link. The VCR actuator 192 is coupled to the control shaft 196 via the actuator linkage 195. The position sensor 193 may be coupled to the control shaft 196 and may be configured to provide feedback to controller 12 regarding the position of the control shaft 196. In one example, position sensor 193 indicates a degree of rotation of the control shaft 196. The control shaft 196 is coupled to the lower link 198 via the control link 197. The lower link 198 is coupled to a crankshaft 40, further coupled to a piston 38 via upper link 199.

In the example depicted in FIG. 1, the VCR actuator 192 is an electric motor, and is supplied with power via a battery 58 to produce motor torque. In other examples, the VCR actuator 192 may be hydraulically or pneumatically driven. In one example, the speed reduction mechanism 194 may be a harmonic drive, and the VCR actuator an electric motor, such that the harmonic drive in conjunction with the actuator linkage 195 may convert a given amount of electric motor rotation into a lesser amount of control shaft 196 rotation but high enough torque to withstand the combustion loading. The speed reduction mechanism 194 may alternatively include a cyclical reduction gear. In the depicted example, the position sensor 193 is a rotary-type potentiometer for sensing the rotation angle of control shaft 196. However, in other examples, the position sensor 193 may be a rotary encoder or other type of position sensor, and may be coupled to any of the components of the VCR mechanism 180, so long as the position sensor output enables the controller 12 to infer the current position of the VCR mechanism, and thereby the cylinder CR. In the example depicted in FIG. 1, the actuator linkage 195 is an S linkage and the control shaft 196 is rotatably supported on the engine body and possesses an eccentric region. The control link 197 may be attached to the eccentric region of the control shaft 196 such that, as the control shaft 196 changes angular position, the eccentric region also changes angular position, causing the control link 197 to either move up (towards piston 38) or down (away from piston 38), depending on the initial and final position of the control shaft 196. In one example, the lower link may be attached to the crankshaft 40 at a central or middle region (of the lower link 198), with the control link 197 and upper link 199 attached at opposing sides of this central region, such that movement of the control link upwards (towards piston 38) causes the upper link to move downwards (away from the piston 38), or vice versa, as the lower link 198 pivots about its crankshaft 40 attachment point. As the upper link 199 moves up or down, a piston stroke characteristic including piston TDC position relative to piston BDC position will change, thereby changing cylinder CR.

The control system 12 may measure the position of control shaft 196 via position sensor 193. By sensing the rotation angle of control shaft 196 via position sensor 193, the controller 12 may infer a cylinder CR. The current supplied by the battery 58 to the VCR actuator 192 may be controlled by controller 12 based on a desired position of the VCR actuator that provides a target CR setting. Once a CR setting is commanded, the controller may further control the VCR actuator position via position feedback control based on input from a position sensor, such as position sensor 193. Therein, the control shaft 196 position corresponding to the commanded CR setting is maintained based on a measured position of the control shaft 196 as determined by position sensor 193. As the control shaft is subject to forces arising from combustion within the engine cylinder 30, the controller 12 may apply a current to VCR actuator 192 from battery 58, proportional to the control shaft torque and in a direction, to maintain control shaft position (and therefore CR) at a commanded set point. This current is also referred to herein as the holding current, that is, the current required to be applied to hold the VCR actuator in a given position (corresponding to a commanded CR).

The holding current is representative of the holding torque that is applied on the VCR actuator's control shaft. Due to the cyclical loading of the cylinder pressure on the VCR shaft, the holding torque changes cyclically. This causes the actual position of the control shaft to continuously drift between a position that overshoots and a position that undershoots the desired position. The result is an angular position drift ($\Delta_\theta$) away from the mean position—depicted at FIG. 9. As shown at map 900, the holding torque (plot 904, dashed line) fluctuates due to the angular movement of the VCR control shaft and the movement of the shaft between the overshot and the undershot positions. By summing up the differences between each local maxima and each local minima of the torsional draft pattern (of plot 904), a change in the average holding current can be calculated, represented by plot 902 (solid line).

The total VCR holding torque is then calculated as:

$$\text{Total VCR holding } Tq = K(\text{VCR holding current} + \Delta_\theta * \text{Gain})$$

$\Delta\theta$ represents the error in control shaft position. Gain should be high enough to apply a retarding current to oppose small errors in position, and K is the torque constant and is a property of the electric actuator that converts current into a torque. The sum should be near zero to make sure CR is not drifting.

The VCR 180 mechanism may be coupled to a conventional cranktrain or an unconventional cranktrain. Non-limiting examples of an unconventional cranktrain to which the VCR mechanism 180 may be coupled include variable distance head crankshafts and variable kinematic length crankshafts. In one example, crankshaft 40 may be configured as an eccentric shaft. In another example, an eccentric may be coupled to, or in the area of a piston pin, the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). In still another example, the VCR mechanism may include a hydraulic pressure, air pressure, or mechanical spring reactive piston. Further still, the VCR mechanism may include a multi-link mechanism or a bent rod mechanism. Still other VCR mechanizations may be possible. It will be appreciated that as used herein, the VCR engine may be configured to adjust the CR of the engine via mechanical adjustments that vary a piston position or a cylinder head position or a cylinder head volume. As such, VCR mechanisms do not include effective CR adjustments achieved via adjustments to a valve timing or cam timing.

By adjusting the position of the piston within the cylinder, an actual (static) compression ratio of the engine (that is a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to the VCR actuator 192 to actuate the VCR mechanism 180 to a first position where the piston has a smaller effective displacement within the combustion chamber. As one example, the controller 12 may select a lower CR setting, and command a corresponding current to the VCR actuator 192, where the VCR actuator may be a harmonic drive motor. This causes the harmonic drive motor to undergo a designated amount of rotation, which is transduced to the control shaft 196 via the S linkage. The eccentric region of control shaft 196 then undergoes an angular displacement causing the control link 197 to move up, towards piston 38. Through the pivoting action of the lower link 198, the upper link 199 and piston 38 are moved lower in cylinder 30 at TDC, thus decreasing the cylinder CR. As another example, the engine may be operated at a second, higher compression ratio by the controller sending a signal to the VCR actuator 192 to actuate the VCR mechanism 180 to a second position where the piston has a larger effective displacement within the combustion chamber. As one example, the controller 12 may select a higher CR setting, and command a corresponding current to the harmonic drive motor. This causes the harmonic drive motor to undergo a designated amount of rotation, which is transduced to the control shaft 196 via the S linkage. The eccentric region of control shaft 196 then undergoes an angular displacement causing the control link 197 to move down, away from piston 38. Through the pivoting action of the lower link 198, the upper link 199 and piston 38 are moved higher in cylinder 30 at TDC, thus increasing the cylinder CR.

The inventors herein have further recognized that the crank angle at which TDC occurs varies with compression ratio. This relationship is shown at map 800 of FIG. 8. As elaborated with reference to FIGS. 4-5, by commanding a VCR actuator to a selected compression ratio, and then learning an engine position (in CAD) at which a peak holding current occurs (for the commanded compression ratio), an engine controller may learn an error in the CR position. In other words, the relationship shown at FIG. 8 can be used to infer the actual CR of a VCR actuator in a given cylinder. As an example, intake valve closing (IVC) timing may be used to define the start of a compression event (or compression stroke) of the cylinder. If the estimated CR based on the IVC timing of the cylinder corresponds to 150 CADs, an engine controller may extrapolate the reading and calculate the actual CR corresponding to 180 CADs. The IVC closing timing as well as pressure (map) and temperature are used to estimate air mass. Based on ideal gas law, the holding current near TDC is proportional to the pressure at TDC. This technique can be advantageously used during DFSO events since the combination of piston position and spark timing alters the position of peak pressure and actuator current.

Changes in the engine compression ratio may be advantageously used to improve fuel economy. For example, a higher compression ratio may be used to improve fuel economy at light to moderate engine loads until spark retard from early knock onset erodes the fuel economy benefit. The engine can then be switched to a lower compression ratio, thereby trading off the efficiency benefits of higher compression ratio for the efficiency benefits of optimized combustion phasing. Continuous VCR systems may continuously optimize the trade-offs between combustion phasing and the efficiency benefits of higher compression ratio, to provide the optimal compression ratio between the higher compression ratio and lower compression ratio limits at the given operating conditions. In one example, an engine controller may refer a look-up table to select a compression ratio to apply based on engine speed-load conditions. As elaborated below, the selecting may include selecting a lower compression ratio at higher engine loads, and selecting a higher compression ratio at lower engine loads.

Cylinder 30 can receive intake air via a series of intake air passages 42, and 44. Intake air passage 44 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 162 arranged between intake passages 42 and 44, and an exhaust turbine 164 arranged along exhaust passage 48. Compressor 162 may be at least partially powered by exhaust turbine 164 via a shaft 163 where the boosting device is configured as a turbocharger. However, in other examples, such as where engine 10 is provided with a supercharger, exhaust turbine 164 may be optionally omitted, where compressor 162 may be powered by mechanical input from a motor of the engine. A throttle 62 including a throttle plate 64 may be provided along an intake passage of the engine for varying the flow rate and/or pressure of intake air provided to the engine cylinders. For example, throttle 62 may be disposed downstream of compressor 162 as shown in FIG. 1, or alternatively may be provided upstream of compressor 162. In addition, the engine system may include an air intake system (AIS) throttle 63 and throttle plate 65 located upstream of the compressor in intake passage 42.

Exhaust passage 48 can receive exhaust gases from other cylinders of engine 10 in addition to cylinder 14. Exhaust gas sensor 126 is shown coupled to exhaust passage 48 upstream of emission control device 72. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 72 may be a three way catalyst (TWC), NOx trap, various other emission control devices, or combinations thereof.

Exhaust temperature may be estimated by one or more temperature sensors (not shown) located in exhaust passage 48. Alternatively, exhaust temperature may be inferred based on engine operating conditions such as speed, load, air-fuel ratio (AFR), spark retard, etc. Further, exhaust temperature may be computed by one or more exhaust gas sensors 126. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 52 and at least one exhaust poppet valve 54 located at an upper region of cylinder 30. In some embodiments, each cylinder of engine 10, including cylinder 30, may include at least two intake poppet valves and at least two exhaust poppet valves located at an upper region of the cylinder.

Intake valve 52 may be controlled by controller 12 by cam actuation via cam actuation system 51. Similarly, exhaust valve 54 may be controlled by controller 12 via cam actuation system 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by valve position sensors 55 and 57, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock through charge cooling. The compression ratio may also be mechanically varied based on driver demand via adjustments made to the VCR mechanism by the VCR actuator 192, varying the effective position of piston 38 within combustion chamber 14. In one example, in the case that the VCR actuator 192 is an electric motor, the compression ratio may be inferred from the current provided to this motor. The current supplied to the VCR actuator 192 produces a torque therein, which is transduced via the actuator linkage 195 to the control shaft 196, where it serves to counter the combustion induced torque acting upon the control shaft, such that no net torque acts on the control shaft 196. In this way the VCR actuator 192 maintains the control shaft 196 at a commanded position (angle of rotation). The combustion induced torque which acts upon the control shaft 196 is proportional to the combustion forces occurring within the engine cylinder 30 as conveyed through the linkages between the control shaft 196 and piston 38. The arrangement of the linkages will change the proportionality between the combustion forces and the combustion induced torque experienced by the control shaft as the mechanical leverage depends upon this arrangement. The combustion forces within the engine cylinder 30 are in turn a function of the compression ratio of that cylinder. Thus, based upon the current supplied to the VCR actuator 192, the combustion forces within the cylinder 30, and thereby the actual compression ratio of that cylinder 30, may be inferred without the need for additional components or sensors.

Since valve timing (or cam timing) affects an amount of air mass trapped in a cylinder, it affects the cylinder pressure. By accounting for the valve timing, using ideal gas law, it may be possible to estimate a cylinder pressure at TDC. This may be taken into account when learning a VCR holding torque (or VCR holding current) at TDC, which is used to measure an actual CR of a cylinder, as elaborated at FIGS. 4-5.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion chamber 30. While FIG. 1 shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 66 from a high pressure fuel system including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 66 may be a port injector providing fuel into the intake port upstream of cylinder 30.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 126. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows one cylinder of a multi-cylinder engine. As such each cylinder may similarly include its own set of intake/exhaust valves, fuel injector(s), spark plug, etc.

Engine 10 may further include a knock sensor 90 coupled to each cylinder 30 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft position sensor such as a Hall Effect sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. For example, knock may be identified responsive to knock sensor output estimated in a knock window being higher than a knock threshold, while pre-ignition may be identified responsive to knock sensor output estimated in a pre-ignition window being higher than a pre-ignition threshold, the pre-ignition threshold higher than the knock threshold, the pre-ignition window earlier than the knock window. Further, the abnormal combustion may be accordingly addressed. For example, knock may be addressed by reducing the compression ratio and/or retarding spark timing while pre-ignition may be addressed by enriching the engine and/or limiting an engine load. In addition, lowering the compression ratio also reduces the changes of further pre-ignition.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 48 to vehicle wheels 59 when one or more clutches 56 are engaged. In the depicted example, a first clutch 56 is provided between crankshaft 40 and electric machine 52, and a second clutch 56 is provided between electric machine 52 and transmission 48. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 48 and the components connected thereto. Transmission 48 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; absolute manifold pressure signal (MAP) from sensor 122, cylinder AFR from EGO sensor 126, abnormal combustion from knock sensor 90 and a crankshaft acceleration sensor. The VCR mechanism position may be obtained from sensor 193, which may be a rotary-type potentiometer or rotary encoder for sensing the rotation of the control shaft 196 or actuator linkage 195. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. Example actuators include throttle 62, fuel injector 66, VCR actuator 192, EGR valve 152 (which controls flow through EGR conduit 150), and waste-gate 82. As one example, based on the engine speed and load, the controller may adjust the compression ratio of the engine by sending a signal to the VCR actuator 192 which actuates the control shaft 196 which in turn adjusts the poster of lower link 198 to mechanically move the piston closer to or further from the cylinder head, to thereby change a volume of the combustion chamber.

Non-transitory storage medium read-only memory 106 can be programmed with computer readable data representing instructions executable by processor 102 for performing the methods described below as well as other variants that are anticipated but not specifically listed.

The actual CR of each cylinder affects the knock limit of that cylinder, particularly at high loads. Due to manufacturing tolerances in the VCR mechanism coupled to each cylinder 30 of engine 10 and variations in the cylinder head chamber volume, there may be significant part-to-part variation between the actual CR of each cylinder and the commanded CR for that cylinder. In addition, for a desired (commanded) CR setting, there may be significant cylinder-to-cylinder variation in actual CR. As a result of these differences, CR calibration may be non-optimal. As one example, a lower CR setting may be commanded responsive to high load conditions. However, due to the actual CR of a cylinder being higher than expected, the resulting non-optimal CR may be higher than desired, resulting in the cylinder becoming excessively knock limited. As another example, a higher CR setting may be commanded responsive to low load conditions. However, due to the actual CR of a cylinder being lower than expected, the resulting non-optimal CR may be lower than desired, resulting in the cylinder becoming combustion stability and NVH limited and at the least fuel inefficient.

The inventors herein have recognized that the relationship between the current supplied to the VCR actuator 192 and the combustion forces occurring within an engine cylinder can be advantageously leveraged to infer the actual CR of a cylinder. The electrical current supplied to the VCR actuator 192 is based upon position feedback control of the control shaft 196 position. This position feedback control scheme may utilize one or more position sensors, such as position sensor 193, to determine the position or torque of one or more components of the VCR mechanism 180, and may supply a current to the VCR actuator 192 based upon this measured position or torque. In the depicted example, position sensor 193 measures the position of control shaft 196, and controller 12 supplies a current to VCR actuator 192 sufficient to counter the displacive forces caused by fuel combustion within the engine cylinder 30. Thus, the current supplied to the VCR actuator depends upon the combustion forces within the engine cylinder 30, and these combustion forces in turn depend upon the CR in said cylinder. This relationship can be utilized to infer an actual CR in an engine cylinder based upon the current supplied to the VCR actuator 192 of that cylinder.

Figure 4:
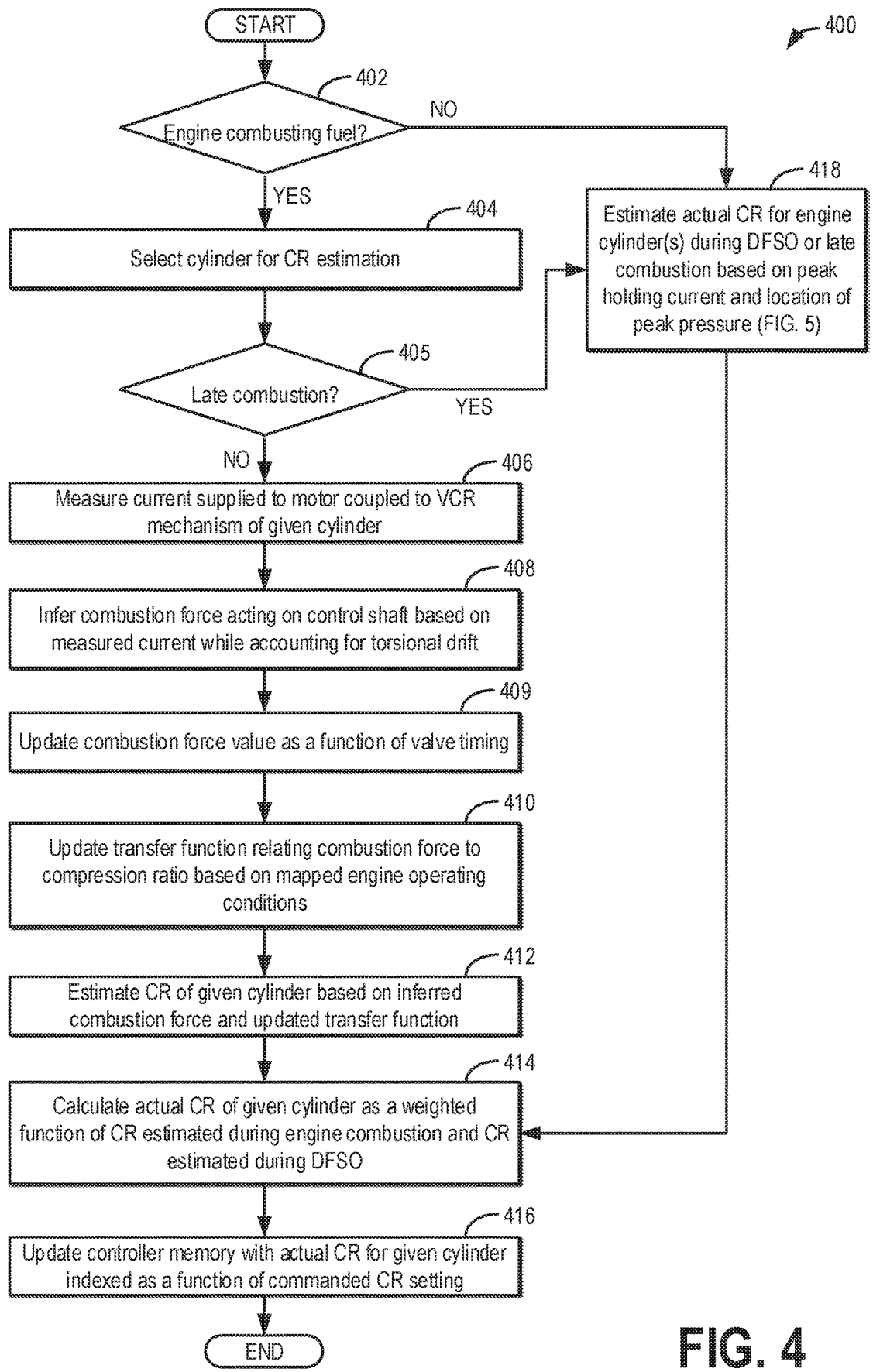
FIG. 4 shows a high level flow chart of an example method for inferring an actual compression ratio of a cylinder using a VCR motor current during fueled engine operation.
Figure 5:
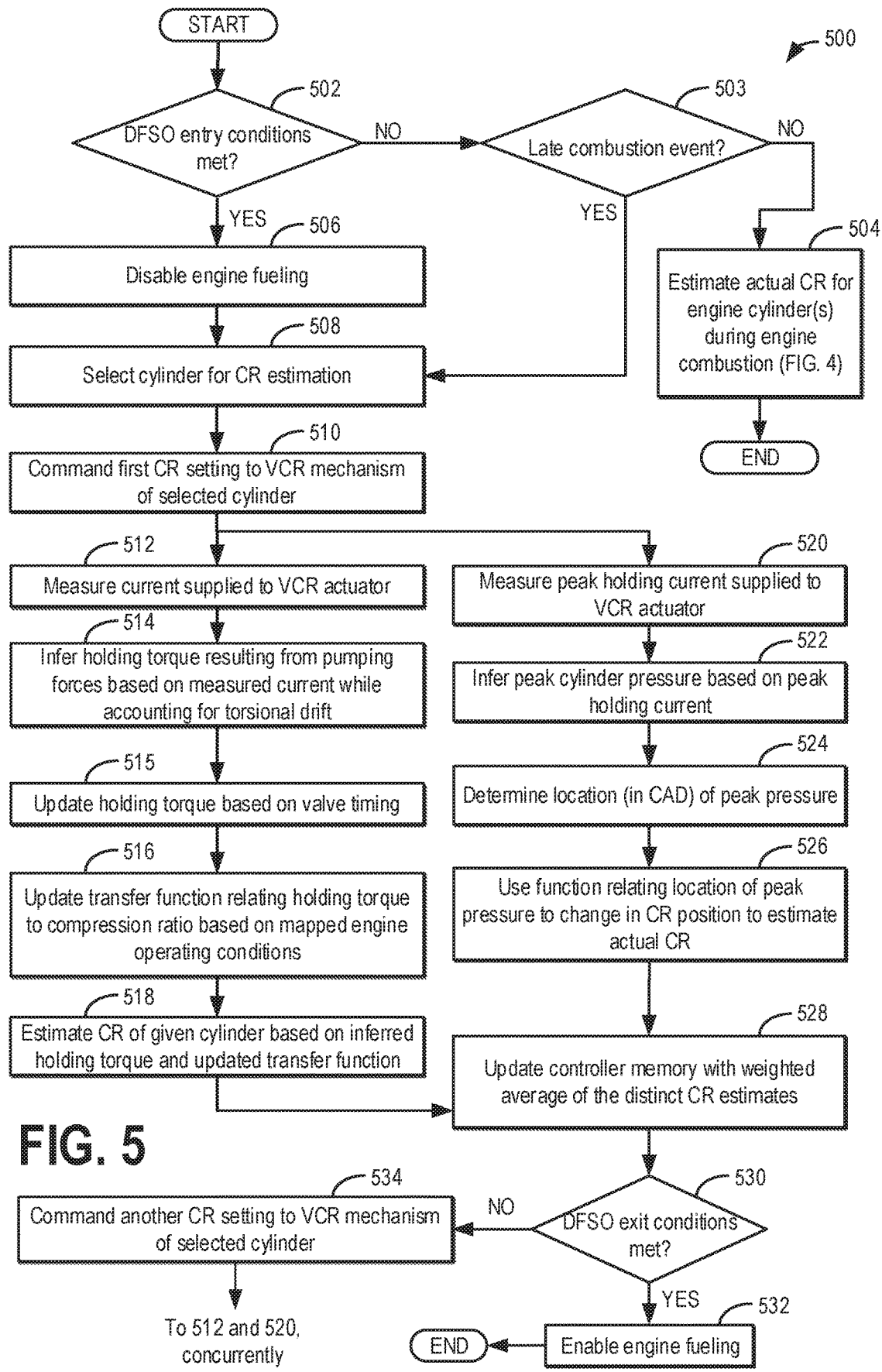
FIG. 5 shows a high level flow chart of an example method for inferring an actual compression ratio of a cylinder using a VCR motor current during DFSO.

As elaborated with reference to FIGS. 4-5, an engine controller may update a CR calibration (that is, a calibration of the CR to command at a given engine speed and load) based on the difference between the commanded and actual CR of each cylinder at each CR setting of the VCR engine. In one example, based on a desired CR of 8.0, controller 12 commands the VCR actuator 192 to move control shaft 196 to a position corresponding to CR 8.0. However, the actual compression ratio, as inferred based on the current supplied to the VCR actuator, is 7.8 at this control shaft 196 position. As such, the controller 12 may update a CR calibration to include that at a control shaft 196 position corresponding to a CR of 8.0, an actual CR of 7.8 was achieved under the given engine operating conditions. The controller 12 may then actuate the VCR actuator 192 to raise the TDC position of the piston 38, until the actual CR, as inferred via VCR actuator 192 current, is 8.0. In another example, according to a CR calibration stored in memory of controller 12, in order to achieve an actual CR of 9.0 the control shaft 196 of a cylinder needs to be commanded to a position corresponding to a CR of 8.8. Thus, to achieve a desired CR of 9.0, a controller 12 may utilize this CR calibration data and command the control shaft 196 to a position corresponding to a CR of 8.8, thus achieving an actual CR of 9.0. Valve timing and torsional drift can affect this base offset calibration of commanding a CR 8.8 to achieve a CR 9. If valve timing was such that a different amount of air is being inducted than that during the calibration process, then the target CR of 8.8 will be altered to achieve an actual CR of 9.0. If the angular drift of the control shaft was such that you are in a trough or valley (such as with reference to FIG. 9), the CR of 8.8 will again have to be adjusted to achieve the correct actual CR. As a result, VCR engine performance may be improved.

Figures 2, 3:
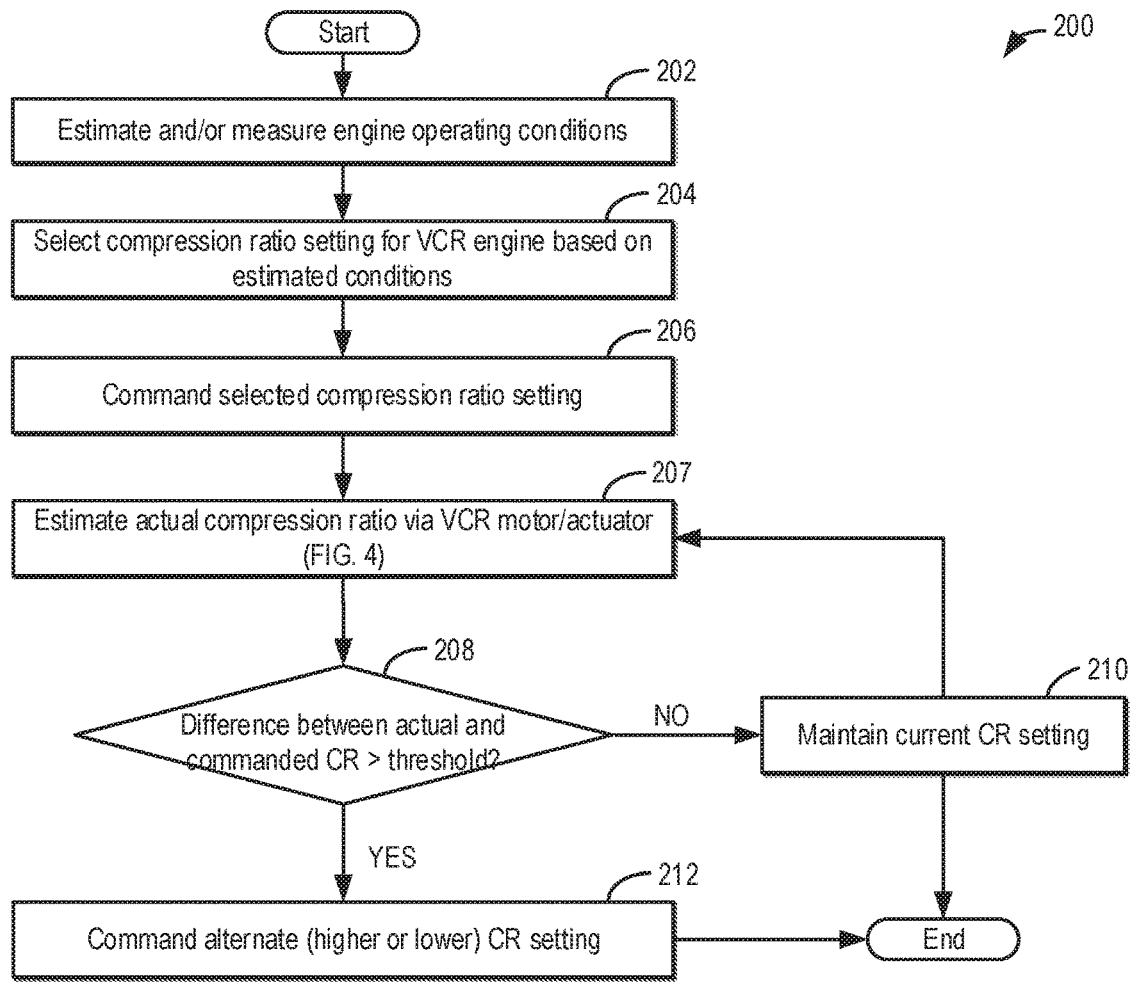
FIG. 2 shows a high level flow chart of a method for selecting a compression ratio setting of an engine cylinder based on engine operating conditions.
FIG. 3 depicts an example compression ratio calibration table showing differences between actual and commanded compression ratios of a VCR engine at different compression ratio settings.

Now turning to FIG. 2, an example routine 200 is described for selecting and commanding a CR setting for a VCR engine based on engine operating conditions. Instructions for carrying out method 200 as well the other methods included herein may be executed by a controller based on instructions stored in a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes estimating and/or measuring engine operating conditions. Engine operating conditions may include, for example, driver power demand (for example, as based on an output of a pedal position sensor coupled to an accelerator pedal); ambient temperature, pressure, and humidity; engine speed, engine temperature; manifold pressure (MAP); manifold air flow (MAF); catalyst temperature; intake temperature; boost level; fuel octane of fuel available in a fuel tank; etc.

At 204, method 200 includes selecting a desired compression ratio setting for operating the engine based on the estimated engine operating conditions. The engine may be configured with a VCR mechanism (e.g., VCR mechanism of FIG. 1) that mechanically alters the engine compression ratio between a first, lower and a second, higher compression ratio setting. For example, the VCR mechanism of each cylinder may be actuated in tandem to the higher or lower CR setting. The VCR mechanism may adjust the CR setting by mechanically altering a piston position within each cylinder. Alternatively, multiple compression ratios between the first and second compression ratio may be possible. In one example, a VCR mechanism such as that described in FIG. 1 may achieve the different CR settings by employing the VCR actuator 192 to change the position (angle) of the control shaft 196 through the actuator linkage 195. In one example the VCR actuator is a harmonic drive motor, the control shaft is a shaft containing an eccentric region (e.g., an ellipse), and the actuator linkage is an S linkage. As the control shaft position (angle) is changed by action of the VCR actuator and actuator linkage, the control link, such as control link 197, changes position. As the eccentric region of the control shaft rotates, the control link attached thereto will move either up (towards the piston head) or down (away from the piston head), depending on the angular orientation of the eccentric region. In one example, the CR of a cylinder may be decreased by changing the angular position of the control shaft such that the control link moves up, causing the lower link, such as lower link 198, to pivot, causing the upper link, such as upper link 199, and the piston head, such as piston 38, to move down. This results in a larger combustion chamber volume when the piston head is at TDC, and thus a smaller CR. Alternatively, the CR of a cylinder may be increased by changing the angular position of the control shaft such that the control link moves down, causing the lower link to pivot, causing the upper link and piston head to rise higher in the combustion. This results in a smaller combustion chamber volume when the piston is at TDC, and thus a larger CR. In this way, the example VCR mechanism of FIG. 1 may continuously control the engine CR between a maximum and minimum CR as determined by the shape and size of the eccentric of the control shaft.

The controller may calculate the fuel efficiency at each possible compression ratio of the engine at the given driver power demand and select the compression ratio that provides the highest fuel efficiency. The controller may compare the fuel efficiency at each compression ratio by comparing the brake specific fuel consumption (BSFC) of the engine at each compression ratio, for example, from a look-up table stored in the controller's memory, the look-up table populated during an initial engine calibration based on a prototype engine with substantially the same CR on each cylinder. The fuel efficiency of the engine at each compression ratio may be determined via a table, a map, an algorithm, and/or an equation, each stored as a function of operating conditions (e.g., engine speed, torque, temperature, humidity, inferred fuel octane, etc.), the settings populated during an initial engine calibration based on a prototype engine. In general, as engine load or BMEP increases, the compression ratio selected may be decreased due to trade-offs between the efficiency benefits of higher CR (which dominate at lower loads) versus the efficiency penalties of knock-limited combustion phasing (which dominate at higher loads). Thus, a lower compression ratio is selected at higher engine loads and a higher compression ratio is selected at lower engine loads.

At 206, the method includes commanding the selected compression ratio setting. This includes the controller sending a signal to the VCR actuator of each cylinder to move the VCR mechanism to a position corresponding to the selected CR setting in that cylinder. As one example, if a lower CR setting is selected, the controller may send a signal to the VCR actuator to change position of the control shaft of the VCR mechanism coupled to each cylinder to a first position (or first angle). Adoption of this first position causes structural changes to propagate through the VCR mechanism linkages to the piston, causing the piston head to move further down in the corresponding engine cylinder towards the crankshaft, resulting in a larger cylinder volume when the piston is at TDC, and thereby moving each cylinder to a smaller compression ratio. In another example, if a higher CR setting is selected, the controller may send a signal to the VCR actuator to change position of the control shaft of the VCR mechanism to a second position (or second angle). Adoption of this second position causes structural changes to propagate through the VCR mechanism linkages to the piston, causing the piston head to move further up in the engine cylinder towards the spark plug, resulting in a smaller cylinder volume when the piston is at TDC, and thereby moving the cylinder to a larger compression ratio. In one example, where the VCR mechanism of each cylinder is actuated upon by a common actuator, the CR setting of each cylinder is adjusted to the commanded CR setting in concert.

At 207, after commanding the selected CR to each engine cylinder, the method includes estimating the actual compression ratio of each cylinder at the current setting. As elaborated with reference to FIGS. 4-5, the controller may estimate the CR of a given cylinder based on the electrical current supplied to the VCR actuator to maintain the commanded position of the control shaft, while compensating for torsional drift of the VCR control shaft and the effect of valve (or cam) timing on cylinder pressure. As the VCR actuator may employ position feedback control to maintain the control shaft position at a commanded set point (based on the commanded CR), the current supplied to it will depend upon the combustion forces (and pressures) acting to displace the control shaft. As the combustion forces are related to the CR, a relationship or transfer function exists between the electrical current supplied to the VCR actuator, and CR of the engine cylinder. This relationship, or transfer function, between the current supplied to the VCR actuator by the controller, and the combustion forces within the cylinder, depends upon the geometry of the VCR mechanism, such as the leverages and gear ratios occurring between the various components connecting the VCR actuator and piston head. This relationship/transfer function further depends upon various other factors, including the engine oil and coolant temperatures, the air temperature, the rate of engine spin, the engine load, the VCR actuator temperature, valve timing, torsional drift of the VCR actuator.

At 208, the controller may compare the fuel economy achieved at the commanded CR setting while taking into account any additional spark retard that may need to be applied for cylinders having an actual CR that is higher than the commanded CR. This includes the controller determining a difference between the actual CR and the commanded CR at the current commanded CR setting for each engine cylinder, and further determining if the difference between the actual CR and the commanded CR at the current commanded CR setting is higher than a threshold.

For example, at higher engine loads, it may be determined if the actual CR is higher than the commanded CR by more than a threshold difference. As another example, at lower engine loads, it may be determined if the actual CR is lower than the commanded CR by more than the threshold difference. If not, then at 210, the method includes maintaining the current CR setting. In addition, a CR calibration table stored in the controller's memory may be updated.

If the difference between the actual CR and the commanded CR at the current setting is higher than a threshold, then at 212, the method includes commanding an alternate CR setting. For example, at higher engine loads, if the actual CR is higher than the commanded CR by more than the threshold difference, the VCR mechanism may be commanded to a lower CR setting. As another example, at lower engine loads, if the actual CR is lower than the commanded CR by more than the threshold difference, the VCR mechanism may be commanded to a higher CR setting. As an example, the controller may send a signal to the VCR actuator to move the VCR mechanism to increase or decrease the CR by 0.2 ratios before repeating the sequence of method 200. For an engine where one or more cylinders has a higher than nominal CR, which is operating at a high load where the engine is knock-limited, lowering the CR will improve knock control. Likewise, for an engine where one or more cylinders has a lower than nominal CR, which is operating at a low load where the engine is combustion stability limited, raising the CR will improve NVH. In addition to adjusting the CR setting, a CR calibration table stored in the controller's memory may be updated.

In another example, an engine controller may optimize the CR selection by comparing the sum of all cylinders at higher than desired CR and amount of spark retard needed to control knock with a thermal efficiency of each cylinder at or lower than desired CR. This gives:

Net efficiency=(sum cylinders thermal efficiency at current CR for given load,speed)−(sum of efficiency lost to Spark retard of cylinders that require retard due to knock for given load speed).

To determine the next commanded CR in response to changes in speed and load at time t+1, the net efficiency according to the above equation is recalculated for the new speed-load combination. If the Net efficiency at time t+1 is greater than at time t, then the new commanded CR should be issued. If however, the new efficiency goes down then the CR will remain unchanged.

In other words, if the net result is a positive value, the CR is not changed. Else, if the net result is a negative value, the CR is transitioned to a higher CR. It will be further appreciated that the VCR mechanism may also be diagnosed based on the difference between the commanded and actual CR values. For example, based on the absolute difference at any CR setting being higher than a diagnostic threshold, it may be inferred that the VCR mechanism coupled to the given cylinder is degraded and CR adjustments in the given cylinder may be limited. In one example, by comparing the actual CR estimated via the combustion forces to the actual CR estimated by the VCR position sensor, the VCR mechanism may be diagnosed more reliably. In particular, if the VCR mechanism were diagnosed depending only on CR shaft sensor and without an independent measure of CR, the CR shaft sensor location could cause errors if, for example, it is mis-indexed on the end of the shaft.

FIG. 3 shows an example table 300 where actual CR data may be stored and compared to commanded CR setting. The table of FIG. 3 may be a look-up table stored in the controller's memory. The look-up table may be populated with the data immediately after engine manufacture, replacement, or major service, and updated each time the routine of FIG. 2 is conducted. For example, the CR of each cylinder may be initially quantified by measuring dimensions of key engine parts during manufacturing, and then updated during engine operation. Accordingly, for each cylinder, it can be determined if the actual CR for the given cylinder is over or under the commanded CR setting. For example, with reference to table 300 of FIG. 3, the actual CR of cylinder 1 is significantly higher than the commanded setting while the actual CR of cylinder 4 is significantly lower than the commanded setting, and the difference between expected and actual CR varies with nominal CR. When operating the engine at higher loads, the higher than expected actual CR of cylinder 1 may cause cylinder 1 to be more knock-limited than the other cylinders, thus requiring additional spark retard. This results in a net fuel efficiency penalty for cylinder 1 at high loads. Thus by learning the actual CR accurately based on VCR motor current and position, appropriate compensatory adjustments can be made to improve engine performance.

Turning now to FIG. 4, an example method 400 is shown for estimating an actual compression ratio of an engine cylinder based on an electric current of a motor coupled to the VCR mechanism. In one example, the method of FIG. 4 may be performed as part of the method of FIG. 2, such as at step 207. The method enables the actual CR of the engine cylinder to be estimated during fueled engine operation by relating the electrical current provided to the VCR actuator, such as VCR actuator 192, to the CR of the engine. In this way, the controller may more tightly regulate the CR of each cylinder, and thereby increase engine efficiency.

Method 400 begins at 402, where it is determined if the engine is combusting fuel. If the engine is not combusting fuel, method 400 proceeds to 418 where, as elaborated with reference to FIG. 5, the actual CR of the cylinder is estimated during unfueled engine operation, such as during a deceleration fuel shut-off (DFSO) event. The CR estimation during the DFSO is based on both a peak holding current required to maintain the VCR actuator at a commanded position, as well as a location (in crank angle degrees) of the peak current (or peak holding pressure). During a DFSO, the lack of combustion pressure from the unfueled engine operation results in a higher signal to noise ratio for estimating the peak holding pressure on the VCR shaft, improving the reliability of VCR estimation. The method then moves to 414.

If, at 402, it was determined that the engine is combusting fuel, method 400 proceeds to 404. At 404, the method includes selecting a cylinder for CR estimation. In one example, the cylinder selected is that which most recently had a CR commanded to it, where the commanded CR is based upon engine operating conditions. In another example, the cylinder selected is that which is next in the firing order. In another example, a cylinder may be selected based on the order of CR estimation on the last iteration of method 400, the last selected cylinder on the previous iteration being selected last on the current iteration. In still further examples, the cylinder may be selected according to a predefined order or based on the location of the cylinder on the engine block. Method 400 may then proceed to 405.

At 405, it is determined if the selected cylinder is undergoing late combustion. For example, it may be determined if the selected cylinder has spark timing retarded such that it is close to TDC, the peak compression pressure of the burn event is located after TDC. As an example, it may be determined if spark timing is retarded by 15 degrees retard or more. Generally, 5-7 degrees either side of MBT causes about 1% difference in torque. If yes, then the method proceeds to 418 where, as elaborated with reference to FIG. 5, the actual CR of the cylinder is estimated during the late combustion event of the cylinder based on both a peak holding current required to maintain the VCR actuator at a commanded position, as well as a location (in crank angle degrees) of the peak current (or peak holding pressure). During a late combustion event, the delayed location of peak combustion pressure results in a higher signal to noise ratio for estimating the peak holding pressure on the VCR shaft, improving the reliability of CR estimation. The method then moves to 414. The algorithm may identify a peak near TDC to see where peak compression pressure occurs, and a second peak later to identify where peak combustion pressure occurs.

If fueled engine operation is confirmed and the combustion event in the selected cylinder is not a late combustion event, the method moves to 406 where the controller measures the electric current applied to the VCR actuator of the selected cylinder. The current applied to the VCR actuator may be determined by a controller, such as controller 12, and may be provided according to a position feedback control scheme, where a position sensor, such as position sensor 193, may provide position feedback information to the controller following the commanding of a selected CR setting. As the position of one or more VCR mechanism components moves further away from a set point (or experiences a greater displacive force/torque), the current applied to the VCR actuator to maintain the VCR component at a desired positional set point, may increase. In this manner, the electrical current applied by the controller to the VCR actuator may reflect the combustion forces exerted on one or more components of the VCR mechanism, thereby providing a measurable relation between the applied VCR actuator current and engine combustion forces. In one example the VCR actuator is a harmonic drive motor, and the current applied is proportional to the torque output of this harmonic drive motor. In another example, the current applied to the VCR actuator may be continuously monitored via the controller and stored in memory. In this way, a current time-course may be obtained. In another example, the current applied to the VCR actuator may be sampled at selected time points, or crankshaft positions. In the case that the current is measured through time, one or more features of the current time-course may be measured and used to infer the CR of the cylinder. In one example the root-mean-squared (rms) average of the current time-course may be used to infer a cylinder CR. In another example, one or more current peaks or troughs may be used to infer the CR of the selected cylinder, such as the maximum current supplied to maintain VCR actuator position during one full rotation of the crankshaft. Method 400 may then proceed to 408.

At 408, based on the electrical current measured at 406, the controller may infer the combustion force(s) acting on the control shaft. The relationship between the measured electrical current and combustion forces acting on the control shaft may be updated according to the current engine operating conditions. The relationship between electric current applied to the VCR actuator and the combustion forces acting on the control shaft may depend upon one or more or all of the temperature of the VCR actuator, the geometry/arrangement of the linkages between the VCR actuator and control shaft (such as the S linkage), the engine oil temperature, the air temperature, etc. In one example, the controller may refer to a look-up table stored in the controller's memory to obtain the combustion force acting on the control shaft given an applied electrical current to the VCR actuator. The look-up table may use the engine operating conditions and applied VCR actuator current as input and may output the inferred combustion force acting on the control shaft. The look-up table may also include a gain value that compensates for the torsional drift experienced on the VCR control shaft. For example, deviation from a desired setting may be summed (or integrated) over the cycle to make sure the position is being held. If integration is not zero during selected segments of the cycle, then it is inferred that some movement of the CR mechanism is occurring.

In another example, the relationship between the electrical current applied to the VCR actuator and the combustion forces acting on the control shaft may be stored in the form of a transfer function, algorithm, or model with the values of the above-mentioned engine operating conditions as variables. In one example, as depicted by map 600 of FIG. 6, the rms average current (rms average control shaft torque) applied to the VCR actuator may be used to determine the combustion forces/torque acting on the control shaft.

At 409, the inferred combustion force value is further updated as a function of the cylinder's valve or cam timing. For example, the combustion force may be updated as a function of IVC. The cam/valve timing affects the amount of air mass trapped in the cylinder. In particular, IVC defines the start of the compression stroke of the cylinder. The controller may use the learned IVC and the ideal gas law to compensate for the contribution of the trapped air mass on the holding torque experienced by the VCR control shaft. For example, if the estimated CR based on the IVC timing of the cylinder corresponds to 150 CADs, the controller may extrapolate the reading and calculate the actual CR corresponding to base IVC (for example, 180 CADs) when the cylinder force versus CR calibration table was created. In this way, based on a measured VCR actuator holding current, the combustion force(s) acting on the control shaft may be inferred. Method 400 may then proceed to 410. In another example, the estimate of pressure is done at or near TDC compression stroke which would commonly be referenced as 360 degrees ATDC.

At 410, the controller updates the transfer function relating the estimated combustion force to actual cylinder CR based on mapped engine operating conditions. For example, the transfer function may be updated based on one or more of a mapped engine oil temperature, engine coolant temperature, ambient air temperature, type of fuel being combusted, arrangement/geometry of mechanical components (to infer relevant mechanical advantages/leverages), or other parameters which may alter the relationship between combustion forces and CR. By updating the transfer function between combustion forces and CR within a cylinder based on current engine operating conditions, a more accurate estimation of cylinder CR may be achieved. Method 400 may then proceed to 412.

In one example, as the engine oil temperature increases, the transfer function may be updated to reflect a steeper relationship between estimated combustion force and actual CR. Thus, for a given combustion force, a lower actual CR may be estimated when the engine temperature is higher and a higher actual CR may be estimated when the engine temperature is lower. In another example, as the temperature of the intake air decreases, the transfer function may be updated to reflect a steeper relationship between combustion force and actual CR. Thus, for a given combustion force, a lower actual CR may be estimated when the air temperature is lower, and a higher actual CR may be estimated when the intake air temperature is higher. In the case of a DFSO, the oil temperature may be used instead of the engine coolant temperature (ECT) because the oil temperature affects the friction in the eccentric shaft bearing journals, and therefore the VCR actuator motor torque required. ECT can be used as a surrogate if oil temperature is not available.

VCT position may also be required to be known to estimate the air charge. Intake air temperature (IAT) as measured by an IAT sensor, or manifold charge temperature (MCT) as measured via an MCT sensor, may be used to estimate air charge inducted into the cylinder to account for differences in compression and expansion forces in a motored cycle. If estimates are done using combusted information, the controller may need to also estimate and account for the amount of spark advance or retard from MBT, as well as the air fuel ratio, VCT setting, and any external EGR (e.g., low pressure EGR) that is being applied. For example, the inferred torque estimate may be based on engine speed, engine load or air charge, VCT, EGR, air-fuel ratio, and spark timing, and then an estimated friction torque may need to be subtracted from the inferred torque estimate to calculate the engine brake torque.

At 412, the controller may estimate the CR of the cylinder based on the inferred combustion force acting on the control shaft and the updated transfer function relating this force to the CR of the selected cylinder. In one example, the controller may refer to a look-up table stored in the controller's memory to obtain the CR based upon the inferred combustion forces acting on the control shaft and engine operating conditions. The look-up table may use the engine operating conditions and combustion force applied to the control shaft as input, and may output the estimated CR of the selected cylinder. In another example, the relationship between the combustion force acting on the control shaft and the CR of the selected cylinder may be stored as a function/model with the values of the combustion force and engine operating conditions as input variables, and the estimated CR of the selected cylinder as the output Method 400 may then proceed to 414.

At 414, the actual CR estimated for the given engine cylinder during a DFSO is retrieved and used in conjunction with the actual CR of the selected engine cylinder determined during fuel engine operation to calculate a final actual CR value. For example, the final actual CR value may be calculated as a weighted function of CR estimated during engine combustion and CR estimated during DFSO. A higher weightage is given to the CR estimated during DFSO conditions (relative to the CR estimated during fueled engine operation) due to the improved signal to noise ratio in the absence of combustion forces.

At 416, the controller may update its memory with the estimated actual CR for the selected cylinder as a function of the commanded CR setting for that cylinder. As one example, with reference to FIG. 3, the controller may update its memory with the actual CR measured for each cylinder (Cyl_1-4 in FIG. 3) at each commanded (or nominal) CR (8,10,12,14). In a more specific example, with reference to FIG. 3, the controller may update its memory to reflect that cylinder 1 has an actual CR of 8.4 when commanded to a CR of 8.0. Method 400 may then end.

The controller may then select another cylinder and repeat method 400. This process may be repeated for each cylinder as needed or according to a schedule, and in this way an accurate calibration curve relating commanded cylinder CR and actual CR for each cylinder at each CR setting may be maintained.

It will be appreciated that a single transfer function relating an applied VCR actuator current to the actual CR of a selected cylinder may also be employed, as opposed to the method described above which uses a first transfer function to relate applied VCR actuator current to the combustion forces acting on the control shaft, and then uses a second transfer function to relate this combustion force to an actual CR.

Turning now to FIG. 5, an example method 500 is shown for estimating an actual compression ratio of an engine cylinder based on the electric current of a motor coupled to the VCR mechanism during a DFSO event and a late combustion event. In one example, the method of FIG. 5 may be performed as part of the method of FIG. 4, such as at step 418. The method enables estimating the actual CR of the selected engine cylinder during unfueled engine operation, such as during deceleration fuel shut-off (DFSO) events, or late combustion, by relating the electrical holding current provided to the VCR actuator, such as VCR actuator 192, to the actual CR of the engine. In this way, the controller may more accurately compensate for CR variations in each cylinder, and thereby increase engine efficiency.

It will be appreciated that while the method of FIG. 5 teaches estimating the actual CR of each cylinder individually, this is not meant to be limiting. For example, the method of FIG. 5 may be implemented in an engine system where there is a resolver motor coupled to each cylinder. In an alternate implementation, such as where a single resolver motor is connected via a link to a a single eccentric controls shaft that changes the CR of all cylinders simultaneously, the measurement of the current or torque of the motor may be done as a function of firing order. Therein, each cylinder may be measured in 720 degrees of engine rotation at each CR. For example, the controller may command a CR setting to all engine cylinders and measure the motor current and combustion forces on the motor for a duration while operating the engine cylinders at the commanded CR. Then, based on the firing order and the timing (e.g., in crank angle degrees) at which the measurements were taken, the controller may parse out the actual CR data corresponding to each fitting cylinder.

Method 500 begins at 502, where it is determined if one or more DFSO entry conditions are met. DFSO entry conditions may include, but are not limited to, one or more of an accelerator pedal not being depressed, a constant or decreasing vehicle speed, and a brake pedal being depressed. An accelerator position sensor may be used to determine the accelerator pedal position. The accelerator pedal position may occupy a base position when the accelerator pedal is not applied or depressed, and the accelerator pedal may move away from the base position as accelerator application is increased. Additionally or alternatively, accelerator pedal position may be determined via a throttle position sensor in examples where the accelerator pedal is coupled to the throttle or in examples where the throttle is operated in an accelerator pedal follower mode. A DFSO may be initiated when there is a constant or decreasing vehicle speed due to a torque demand being either constant or not increasing. The vehicle speed may be determined by a vehicle speed sensor. The brake pedal being depressed may be determined via a brake pedal sensor.

If DFSO entry conditions are not met, at 503, it is determined if a late combustion event is occurring. A late combustion event is confirmed if spark timing is retarded in a cylinder by more than a threshold amount such that the peak combustion pressure is delayed from an average location. The method then moves to 508. If a late combustion event is not confirmed, at 504, the engine will continue to run fueled and the controller may estimate the CR for engine cylinder(s) during fueled engine operation according to method 400 of FIG. 4. Method 500 may then end.

If at 502, the controller determines that DFSO entry conditions are met, the controller may initiate a DFSO event, which includes disabling cylinder fueling while continuing to operate cylinder valves to pump air through the cylinders, as at 506. Subsequent to disabling engine fueling at 506, method 500 proceeds to 508. At 508, the method includes selecting a cylinder for CR estimation. In one example, the cylinder selected is that which most recently had a change in CR commanded to it. In another example, the cylinder selected is that which is next in the firing order. In still another example, the cylinder that is selected is the one that is the first to be deactivated during the DFSO. In yet another example, the cylinder that is selected is a cylinder where the first compression event occurs after TDC. In another example, a cylinder may be selected based on the order of CR estimation on the last iteration of method 500, the last selected cylinder on the previous iteration being selected last on the current iteration. In still further examples, the cylinder may be selected according to a predefined order or based on the location of the cylinder on the engine block. Once a cylinder is selected the method may proceed to 510.

At 510, the controller commands a first CR setting to the VCR mechanism of the selected cylinder. As no fuel is being combusted, the controller may command any CR setting achievable by the VCR mechanism. In one example, a CR may be commanded to the selected cylinder based on the amount of time elapsed since that CR was last calibrated via method 500. In another example, the CR commanded may be based on variability of previous measurements of that cylinder, such that a CR may be commanded with the largest measured deviation between actual CR and commanded CR for the given cylinder. In another example, the CR commanded may be based on a fixed schedule, with the CR commanded being the next according to that predefined schedule.

After selecting a CR, and commanding that CR to the selected cylinder, method 500 proceeds to 512 and 520 concurrently. Commanding the selected CR includes the controller sending a signal to the VCR actuator to adjust one or more components of the the VCR mechanism, such as the control shaft, to a position corresponding to the selected CR setting. The controller may receive position feedback from one or more position sensors associated with one or more components of the VCR mechanism, to monitor VCR mechanism position. Based on the feedback provided by the positions sensor(s), the controller may adjust the signal sent to the VCR actuator in order to achieve the commanded CR setting.

At 512, the controller measures the electric current applied to the VCR actuator of the selected cylinder. The controller may learn a peak holding current while reflects a peak holding pressure experienced on the VCR control shaft. The current applied to the VCR actuator may be regulated by a controller implementing position feedback to maintain the VCR mechanism at the commanded position/CR. As such, a position sensor, such as position sensor 193 of FIG. 1, may provide position feedback information regarding VCR mechanism 180 to the controller following the commanding of a selected CR setting. As the position of one or more VCR mechanism components, such as the control shaft, moves further away from a commanded position (or experiences greater displacive force/torque), the current applied to the VCR actuator to maintain the VCR component at the commanded position/CR, may increase. In other words, the electrical current applied by the controller to the VCR actuator may reflect the holding torque required to counteract the combustion forces/torque experienced by the components of the VCR mechanism. During DFSO, these forces arise from the pumping action of the piston, as it moves up and down within the cylinder. As the pressure within the cylinder increases or decreases, forces (also referred to herein as pumping forces) will be conducted through the position, into the VCR mechanism, and thereby, to the control shaft. Thus, the VCR actuator may provide a holding torque to maintain the VCR mechanism at the commanded position. In this way, the current applied to the VCR actuator during DFSO events can be related to the holding torque, which is in turn related to the pumping forces. In one example the VCR actuator is a harmonic drive motor, and the current applied is proportional to the torque output of this harmonic drive motor. In another example, the current applied to the VCR actuator may be continuously monitored via the controller and stored in memory. In this way, a current profile or time-course may be generated over a duration of the DFSO. In another example, the current applied to the VCR actuator may be sampled at selected time points, or crankshaft positions. In the case that the current is measured continuously through time, one or more features of the current time-course may be measured and used to infer the CR of the cylinder. In one example the root-mean-squared (rms) average of the electrical current time-course may be used to infer a cylinder CR. In another example, one or more electrical current peaks or troughs may be used to infer the CR of the selected cylinder, such as the maximum current supplied to maintain VCR actuator position during one full rotation of the crankshaft. Method 500 then proceeds to 514.

At 514, based on the electrical current measured at 512, the controller may infer the holding torque required to maintain the control shaft in a commanded position. The relationship between the measured electrical current and holding torque, such as a transfer function relating the two, may be updated according to the current engine operating conditions, while also accounting for torsional drift experienced on the VCR control shaft. For example, if the torsional "jitter" integration results in a non zero value over a cycle, it suggests drift has occurred and this information can be used to tune the controller to adapt position control. Therefore, keeping track of the angular drift AO of the control shaft by integrating can be used to modify the expected CR and then compare with the CR calculated from the cylinder pressure forces.

The relationship between electric current applied to the VCR actuator and the holding torque may depend upon one or more or each of the temperature of the VCR actuator, the geometry/arrangement of the linkages between the VCR actuator and control shaft (such as the S linkage), the engine oil temperature, the air temperature, and other engine operating parameters. In one example, the controller may refer to a look-up table stored in the controller's memory to obtain the holding torque corresponding to an applied electrical current to the VCR actuator. The look-up table may use the engine operating conditions and applied VCR actuator current as input and may output the inferred holding torque. In another example, the relationship between the electrical current applied to the VCR actuator and the holding torque may be stored in the form of a transfer function, algorithm, or model with the values of the above-mentioned engine operating conditions as variables. With angular drift, the actual position of the control shaft is AO away from the expected. This actual position changes the CR calculated from the measured current (which is equal to the torque, which is equal to the cylinder forces). In this way, based on a measured VCR actuator current, the holding torque may be inferred. Method 500 then proceeds to 515.

At 515, the inferred holding torque is further updated as a function of the cylinder's valve or cam timing. For example, the holding torque may be updated as a function of IVC. The cam/valve timing affects the amount of air mass trapped in the cylinder. In particular, IVC defines the start of the compression stroke of the cylinder. The controller may use the learned IVC and the ideal gas law to compensate for the contribution of the trapped air mass on the holding torque experienced by the VCR control shaft. For example, if the estimated CR based on the IVC timing of the cylinder corresponds to 150 CADs, the controller may extrapolate the reading and calculate the actual CR corresponding to 180 CADs. In another example, the estimation of CR may be done when the compression is at the maximum pressure near at TDC.

Next at 516, the controller updates the transfer function relating holding torque to CR based on mapped engine operating conditions. For example, the transfer function may be updated based on one or more of a mapped engine oil temperature, engine coolant temperature, ambient air temperature, type of fuel being combusted, arrangement/geometry of mechanical components (to infer relevant mechanical advantages/leverages), or other parameters which may alter the relationship between the holding torque and CR. In one example, as the engine oil temperature increases, the transfer function may be updated to reflect a steeper relationship between estimated holding torque and actual CR. Thus, for a given holding torque, a lower actual CR may be estimated when the engine temperature is higher and a higher actual CR may be estimated when the engine temperature is lower. By updating the transfer function between holding torque and CR within a cylinder based on current engine operating conditions, a more accurate estimation of cylinder CR may be achieved. Method 500 may then proceed to 518.

At 518, the controller estimates the CR of the selected cylinder based on the inferred holding torque and the updated transfer function. In one example, the controller may refer to a look-up table stored in the controller's memory to obtain the CR based upon the inferred holding torque and engine operating conditions. The look-up table may use the engine operating conditions and holding torque as input, and may output the estimated CR of the selected cylinder. In another example, the relationship between the holding torque and the CR of the selected cylinder may be stored as a function/model with the values of the holding torque and engine operating conditions as input variables, and the estimated CR of the selected cylinder as the output. In this way the actual CR of a selected engine cylinder at a commanded CR may be estimated. Method 500 then proceeds to 528.

In parallel to steps 512-518, wherein the CR is estimated based on the value of a peak holding pressure, the CR is also estimated as a function of peak pressure location at steps 520-526. At 520, the controller measures the peak holding current applied on the VCR actuator. This is the maxima of the holding current plot during DSFO or very retarded spark timing (such as the maxima of plot 900 of FIG. 9). The peak is near TDC for a late combustion cycle as shown. If the estimate is done during DFSO, there may be a peak at or near TDC with no other peak ATC since there is no combustion.

At 522, the controller may infer a peak cylinder pressure based on the peak holding current. For example, a transfer function or algorithm may be used to estimate the a peak cylinder pressure from the peak holding current. At 524, the controller may measure the location of the peak pressure. The location herein is an engine piston position in crank angle degrees (CADs). At 526, the controller may apply a function relating location of peak pressure to change in CR position to estimate actual CR. This is because the position of TDC changes with CR. In one example, the controller may refer to the relationship shown at FIG. 8 to infer the change in CR due to the change in peak pressure location. Peak pressure location estimate (especially during DFSO)

may be less sensitive to other noise factors for absolute or differential pressure since items like temperature and trapped air mass can influence the pressure. Using a method that relies on the location of peak pressure may be more robust than a method based on the absolute value of the peak pressure since the latter is influenced by temperature, amount of air in the cylinder, AFR differences, etc. However, the dynamic range of the relationship between CR and location of peak CR can be small. As an example, there may be only a 5 CAD difference between location of peak pressures for CR=8 and CR=18.

At 528, the controller may update its memory with the estimated actual CR for the selected cylinder as a function of the commanded CR for that cylinder. In particular, the controller may use a weighted average of the CR estimated via the different estimation methods. This includes weighting the CR estimated based on the absolute value of the peak holding current (at 512-518) different from the CR estimated based on the location of the peak holding current. Using both methods together provides better information with peak pressure location method establishing that the mechanism is position as intended, and the pressure or differential pressure method ensuring that the actual CR is correct (and can be used to adapt for items such as combustion chamber deposits). To make better use of the current measurement sensitivity, both methods may be applied during DFSO conditions with relatively high cylinder pressures, while at lower pressure levels, the method using the location of peak pressure may be applied.

The chart or table relating the estimated actual CR as a function of commanded CR is known as a calibration curve, or calibration chart for that cylinder. One example of a calibration chart is shown in FIG. 3, which shows the estimated actual CR for four cylinders at nominal/commanded CRs of 8, 10, 12, and 14. At 520 the controller may update a calibration chart/curve such as that shown in FIG. 3 with the newly estimated CR for the selected cylinder at the commanded CR setting. In one example, with reference to FIG. 3, in the case that the selected cylinder was cylinder 1, and that the commanded CR setting was 10, the controller may update the entry found at the intersection of column "Cyl_1" and row "10" in the table of FIG. 3 with the value of this newly estimated actual CR. In this way, the calibration curve/chart relating commanded and actual CRs for each cylinder is updated. Method 500 then proceeds to 522.

In an alternate example, while in the DFSO mode, the controller may command a CR setting to all engine cylinders and monitor the combustion forces and motor current with the commanded CR setting until sufficient data has been collected to estimate the actual CR for each cylinder. Based on a timing of the motor current relative to a piston position as well as a firing order of the cylinders, the controller may determine the actual CR for each firing cylinder. As an example, each cylinder may be measured in 720 degrees of engine rotation at each CR. Once each cylinder has been measured at a first CR, and while still in the DFSO condition, the controller may command a second CR and measure each cylinder at the second CR, and so on.

If the CR estimation was initiated due to entry into DFSO condition, then at 530, the controller determines if DFSO exit conditions are met. DFSO exit conditions may include, but are not limited to, one or more or all of an accelerator being depressed, and a brake pedal being released. In another example DFSO exit conditions may also include a cabin HVAC system turning on. In some examples, other suitable conditions may exist for exiting DFSO. If DFSO exit conditions are met (while the engine was running in a DFSO mode), the controller will resume engine fueling, as at 532. Optionally, the method may then proceed to 504, where the controller may estimate the actual CR for engine cylinder(s) during fueled engine operation according to method 400 of FIG. 4. Method 500 may then end.

If at 522 the controller determines that DFSO exit conditions are not met (while running in the DFSO mode), method 500 may proceed to 534, where the controller selects and commands a new CR setting to the VCR mechanism of the selected cylinder. Method 500 then returns to 512 and 520 concurrently, where the controller repeats the process of estimating the actual CR of the selected cylinder for the commanded CR setting based on value of peak current and location of peak current. Method 500 may continue updating the calibration curve/chart in this way for each cylinder at each commanded CR setting until DFSO exit conditions are met.

In this way, the calibration curve/chart relating the commanded CR and actual CR may be updated entirely, or in part, for one or more cylinders, during DFSO or late combustion events while leveraging the higher signal to noise ratio conferred by the absent or delayed combustion forces at TDC. By updating the calibration curve/chart relating commanded CR and actual CR during DFSO events, the consistent (low variability) relationship between the forces experienced by the piston during unfueled engine spinning and the CR may be leveraged to provide consistent calibration of each cylinder's VCR mechanism, and thereby provide tighter control over engine operation, thus enhancing engine efficiency.

Figure 6:
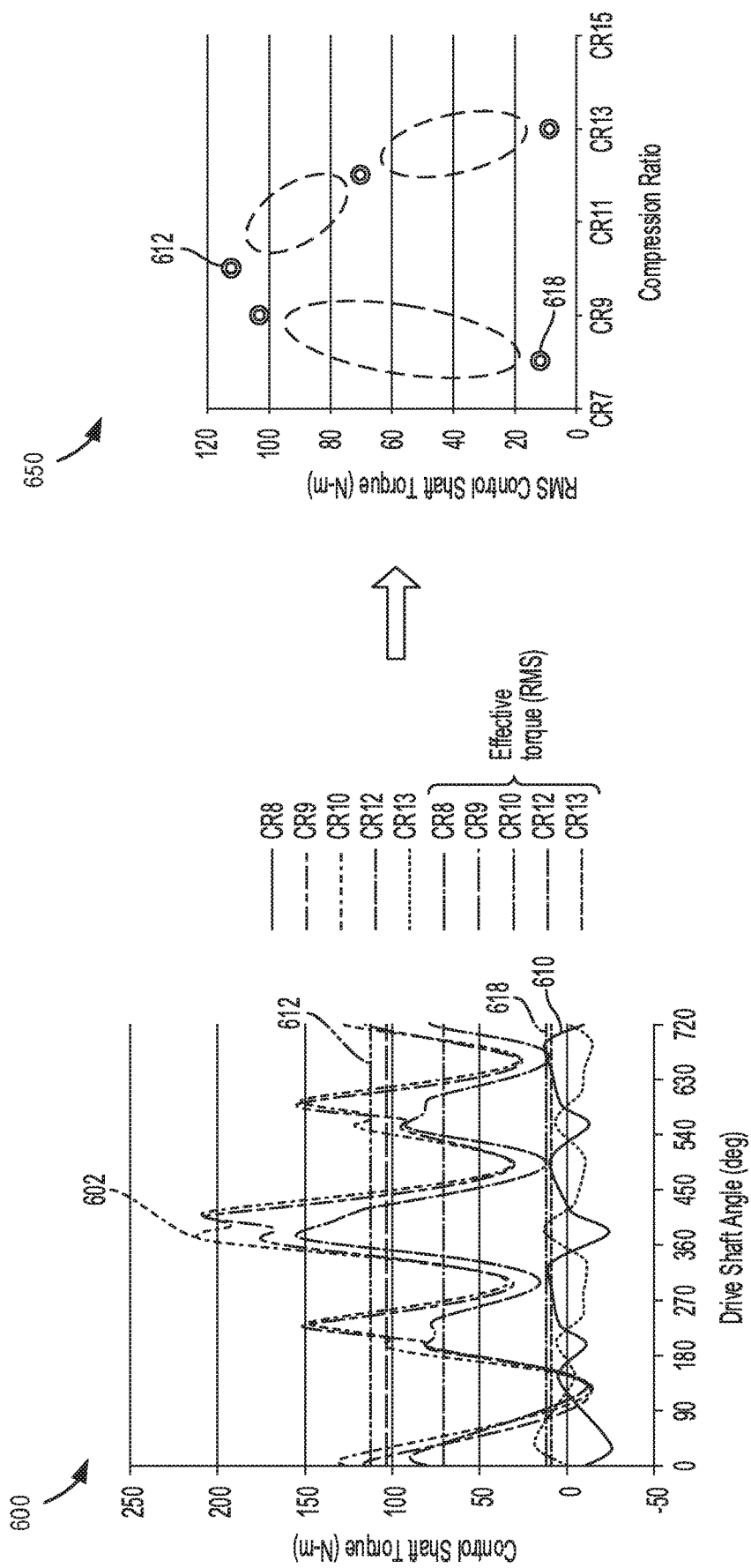
FIG. 6 shows an example mapping of actual compression ratio of a cylinder from a VCR motor control shaft torque.

Referring now to FIG. 6, an example illustrating how the control shaft torque, provided by the VCR actuator to maintain a commanded control shaft position, can be related to the CR of a given cylinder.

Plot 600 shows example time traces of the torque experienced by the control shaft of the VCR mechanism as a function of crankshaft angle. As can be seen, the control shaft experiences different torques depending on the angle of the crankshaft. This is because the angle of the crankshaft correlates with the phase of the engine stroke cycle. Plot 600 shows the control shaft torque time traces for five different CRs. In addition, plot 600 shows the average (RMS) values of control shaft torque, which are represented by the flat lines in plot 600. In one example, time trace 610 illustrates the torque experienced by the control shaft as a function of crankshaft angle at a CR of 8.0, while line 618 shows the average (RMS) value of this torque at CR 8.0. In another example, time trace 602 shows the torque experienced by the control shaft as a function of crankshaft angle at a CR of 10.0, while line 612 shows the average (RMS) value of this torque at this CR. As can be seen, both the time traces of control shaft torque, as well as the RMS values of control shaft torque vary depending on the CR.

By plotting the RMS control shaft torque for a range of known CRs, a curve, such as that shown by plot 650, may be generated. This plot illustrates the relationship between RMS control shaft torque and CR. As examples, the RMS control shaft torque for known CRs 8, and 10, are shown by points 618 and 612 on plot 650. Plots, such as plot 650, can be used to generate transfer functions between RMS control shaft torque and CR, which can in turn be used to relate the electrical current applied to the VCR actuator and the CR of a given cylinder, as this current is related to the control shaft torque as discussed above.

FIG. 7 shows an example timeline 700 for inferring an actual CR of a cylinder as a function of VCR actuator current and engine operating conditions. Timeline 700 includes plot 702, which shows VCR actuator current through time, plot 704, which shows engine oil temperature through time, and finally plot 706, which shows the actual compression ratio of an engine cylinder as inferred from the VCR actuator current. Plot 706 further includes line 710, indicating an actual CR of 10.0, and line 708, indicating an actual CR of 8.0.

Prior to time t1, the VCR actuator of an engine cylinder is maintaining a CR of 8.0, as inferred based on the amount and pattern of current applied to the VCR actuator, as shown in plot 702. The engine oil temperature at this time is lower (e.g., relatively cooler).

At time t1, the controller commands a CR of 10.0 to the cylinder. As such, the VCR actuator current (the pattern and amount) applied by the controller to position and maintain the VCR mechanism at the commanded CR changes (in the depicted example, the current applied increases). The actual CR, as inferred based on the current applied to the VCR actuator, is 10.0, as shown by plot 706. The engine oil temperature at t1 is still at the lower value.

At time t2, the controller commands the CR of the cylinder to return to 8.0. Also around t2, there is an increase in the engine oil temperature to a higher value (e.g., relatively warmer). Accordingly, a transfer function relating the current applied to the VCR actuator and the actual CR is updated to compensate for the higher engine oil temperature. At t2, the current applied to the VCR actuator is higher than the current applied prior to t1. However, despite the increased amplitude in the current applied to the VCR actuator (larger difference between troughs and valleys of applied current as compared to the first instance of a CR of 8.0 being maintained by the VCR actuator, as between t0 and t1), the controller still correctly infers the CR for the cylinder as being 8.0, using the updated transfer function.

At t3, the controller commands the CR of the cylinder to return to 10.0. As such the current applied to the VCR actuator changes, reflecting this new VCR mechanism position. At t3, the current applied to the VCR actuator is higher than the current applied at t2. However, despite the increased amplitude in the current applied to the VCR actuator (larger difference between troughs and valleys of applied current as compared to the first instance of a CR of 10.0 being maintained by the VCR actuator, as between t1 and t2), the controller still correctly infers the CR for the cylinder as being 10.0, using the updated transfer function.

Timeline 700 illustrates several examples of a controller inferring the actual CR of the engine cylinder based on the electrical current applied to the VCR actuator associated with the VCR mechanism of said cylinder. Timeline 700 also gives an example of how a transfer function relating VCR actuator current and CR may be updated based on engine operating conditions. Updating of said transfer function enables the controller to maintain accurate inference of the actual CR of the cylinder, even as engine operating conditions change.

In this way, variations in a cylinder's compression ratio at different commanded CR settings may be learned and compensated for. By correlating the combustion force applied on a VCR mechanism at a commanded CR setting to infer the actual CR provided the VCR mechanism, CR deviations can be learned accurately and reliably. By inferring the combustion torque based on the electric current applied to a harmonic drive motor of the VCR mechanism by an engine controller, the CR variation can be learned using existing components and without relying on additional sensors. In addition, the learning can be performed in real-time, allowing the effects of age and wear and tear to be accounted for.

By relying on repeatable engine motoring pumping work to infer the compression ratio, noise factors associated with CR estimation are reduced, improving accuracy. By learning the cylinder-to-cylinder CR deviations, VCR engine performance can be improved, improving the overall fuel efficiency of the VCR engine.

One example method for an engine comprises commanding a compression ratio for a cylinder via a mechanically actuated variable compression ratio mechanism; and adjusting an actuator in response to an actual compression ratio of the cylinder estimated based on each of a value and a location, relative to piston position, of a peak electric current of a motor coupled to the variable compression ratio mechanism. In the preceding example, additionally or optionally, the motor is a harmonic drive motor coupled to the variable compression ratio mechanism via a linkage, and the electric current is a holding current applied to the motor to maintain the linkage at a position based on the commanded compression ratio. In any or all of the preceding examples, additionally or optionally, the peak electric current is estimated based on each of a measured base current and a gain factor associated with a torsional drift experienced on the linkage during application of the base current. In any or all of the preceding examples, additionally or optionally, the estimating includes: inferring a combustion loading applied on the motor based on the peak electric current; and estimating a compression ratio based on the inferred combustion loading via a transfer function. In any or all of the preceding examples, additionally or optionally, the transfer function is based on one or more mapped engine operating conditions including engine oil pressure, engine mechanical friction, engine coolant temperature, motor actuator temperature, variable cam timing, external EGR, and engine intake air temperature, and wherein the transfer function based on variable cam timing includes adjusting the transfer function based on intake valve closing timing. In any or all of the preceding examples, additionally or optionally, the commanding includes sweeping a plurality of discrete compression ratios during a deceleration fuel shut-off conditions. In any or all of the preceding examples, additionally or optionally, the estimating includes learning a first estimate of the compression ratio while the engine is combusting fuel in the cylinder, learning a second estimate based only on the value of the peak electric current while the engine is spinning unfueled with air being pumped through the engine cylinder via cylinder valves during a deceleration fuel shut-off event, learning a third estimate based only on the location of the peak electric current during the deceleration fuel shut-off event, and estimating an actual compression ratio based on a weighted average of the first, second, and third estimate. In any or all of the preceding examples, additionally or optionally, the method further comprises updating a nominal compression ratio calibration schedule as a function of a difference between the commanded compression ratio and the actual compression ratio at each compression ratio setting of the variable compression ratio mechanism. In any or all of the preceding examples, additionally or optionally, the method further comprises comparing a first fuel economy of the engine at the commanded compression ratio based on the actual compression ratio of each engine cylinder at the commanded compression ratio and spark timing for each engine cylinder, to a second fuel economy of the engine at a lower compression ratio; and selecting an overall compression ratio setting for the engine based on the comparing, the selecting including selecting the commanded compression ratio when the first fuel economy is higher than the second fuel economy, and selecting the lower compression ratio when the second fuel economy is higher than the first fuel economy.

Another example engine method comprises: indicating a cylinder compression ratio based on a combustion torque applied on a harmonic drive motor of a variable compression ratio (VCR) mechanism based on an electric current applied to the harmonic drive motor by a controller during each of a deceleration fuel shut-off event and a late combustion event. In the preceding example, additionally or optionally, the electric current is a peak holding current applied to the motor by the controller to maintain a position of the VCR mechanism at a commanded compression ratio setting, and the method further comprising adjusting a controller command of the VCR mechanism and/or an engine actuator in response to the indicated cylinder compression ratio. In any or all of the preceding examples, additionally or optionally, the estimating is based on each of an absolute value of the peak holding current and a location, relative to piston position, of the peak holding current. In any or all of the preceding examples, additionally or optionally, the electric current applied is adjusted based on feedback from a position sensor coupled to a linkage between the motor and the VCR mechanism, and wherein the combustion torque applied on the harmonic drive motor is directly proportional to the electric current applied to the motor. In any or all of the preceding examples, additionally or optionally, the inferring is based on a weighted average of the estimated combustion torque estimated during the deceleration fuel shut-off event and the estimated combustion torque estimated during the late combustion event. In any or all of the preceding examples, additionally or optionally, the inferring is via a transfer function correlating the compression ratio to the estimated combustion torque, the location of the peak holding current relative to a top dead center position, and a factor indicative of torsional position drift experienced on a control shaft of the VCR mechanism. In any or all of the preceding examples, additionally or optionally, the late combustion event includes fueled engine operation with a higher than threshold spark timing retard, wherein the commanded CR setting is a first setting, the method further comprising, commanding the VCR mechanism to the first CR setting during fueled engine operation with a lower than threshold spark timing retard, and learning the cylinder compression ratio as a function of the commanded first CR setting.

Another example engine system comprises: an engine including a plurality of cylinders; a variable compression ratio (VCR) mechanism coupled to a piston of each cylinder of the plurality of cylinder for applying one of a plurality of compression ratio (CR) settings in a given cylinder via mechanical alteration of a piston position within the given cylinder, the mechanism including an ellipse; a harmonic drive motor coupled to the ellipse via a linkage; a position sensor coupled to the linkage; and a controller with computer readable instructions stored on non-transitory memory for: during selected fueled engine operating conditions and all unfueled engine operating conditions, commanding a VCR mechanism of a cylinder to a first compression ratio (CR) setting; feedback sensing, via a position sensor, a change in position of a linkage of the VCR mechanism following the commanding; applying a current to a motor of the VCR mechanism based on the feedback sensing to maintain the position of the linkage; inferring an actual compression ratio of the cylinder based on a value and a location, relative to piston position, of a peak value of the applied current; and adjusting an engine operating parameter based on a difference between the actual compression ratio and the commanded first CR setting. In the preceding example, additionally or optionally, the system further comprises an engine cylinder; a variable compression ratio (VCR) mechanism coupled to a piston of the cylinder for applying one of a plurality of compression ratio (CR) settings in the cylinder via mechanical alteration of a piston position within the given cylinder, the mechanism including an ellipse; wherein the position sensor is coupled to the linkage, and the motor is a harmonic drive motor coupled to the ellipse via the linkage, and wherein the controller includes further instructions for: learning the difference as a function of the first CR setting; and updating a CR calibration schedule at the first CR setting based on the learned difference. In any or all of the preceding examples, additionally or optionally, the controller includes further instructions for: commanding the VCR mechanism of the cylinder to a second CR setting, different from the first CR setting; and inferring an actual compression ratio of the given cylinder at the second CR setting based on the current applied to the motor based on feedback sensing following the commanding the VCR mechanism of the given cylinder to the second CR setting. In any or all of the preceding examples, additionally or optionally, the selected fueled engine operating conditions include the engine spinning fueled with spark timing retarded by an amount to delay combustion pressure beyond top dead center in the given cylinder. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims shall be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   commanding a compression ratio for a cylinder via a mechanically actuated variable compression ratio mechanism via a controller; and
   adjusting an actuator via the controller in response to an actual compression ratio of the cylinder estimated based on each of a value and a location, relative to piston position, of a peak electric current of a motor coupled to the variable compression ratio mechanism.

2. The method of claim 1, wherein the motor is a harmonic drive motor coupled to the variable compression ratio mechanism via a linkage, and wherein the electric current is a holding current applied to the motor to maintain the linkage at a position based on the commanded compression ratio.

3. The method of claim 2, wherein the peak electric current is estimated based on each of a measured base current and a gain factor associated with a torsional drift experienced on the linkage during application of the base current.

4. The method of claim 1, wherein the estimating includes:
   inferring a combustion loading applied on the motor based on the peak electric current; and
   estimating a compression ratio based on the inferred combustion loading via a transfer function.

5. The method of claim 4, wherein the transfer function is based on one or more mapped engine operating conditions including engine oil pressure, engine mechanical friction, engine coolant temperature, motor actuator temperature, variable cam timing, external EGR, and engine intake air temperature, and wherein the transfer function based on variable cam timing includes adjusting the transfer function based on intake valve closing timing.

6. The method of claim 1, wherein the commanding includes sweeping a plurality of discrete compression ratios during deceleration fuel shut-off conditions.

7. The method of claim 1, wherein the estimating includes learning a first estimate of the compression ratio while the engine is combusting fuel in the cylinder, learning a second estimate of the compression ratio based only on the value of the peak electric current while the engine is spinning unfueled with air being pumped through the cylinder via cylinder valves during a deceleration fuel shut-off event, learning a third estimate of the compression ratio based only on the location of the peak electric current during the deceleration fuel shut-off event, and estimating an actual compression ratio based on a weighted average of the first, second, and third estimates.

8. The method of claim 1, further comprising updating a nominal compression ratio calibration schedule as a function of a difference between the commanded compression ratio and the actual compression ratio at each compression ratio setting of the variable compression ratio mechanism.

9. The method of claim 8, further comprising: comparing a first fuel economy of the engine at the commanded compression ratio based on the actual compression ratio of each engine cylinder at the commanded compression ratio and spark timing for each engine cylinder, to a second fuel economy of the engine at a lower compression ratio; and selecting an overall compression ratio setting for the engine based on the comparing, the selecting including selecting the commanded compression ratio when the first fuel economy is higher than the second fuel economy, and selecting the lower compression ratio when the second fuel economy is higher than the first fuel economy.

* * * * *